(12) United States Patent
Sugawara et al.

(10) Patent No.: US 7,257,292 B2
(45) Date of Patent: Aug. 14, 2007

(54) VARIABLE DISPERSION COMPENSATOR

(75) Inventors: Toshiki Sugawara, Kokubunji (JP); Satoshi Makio, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/483,592

(22) Filed: Jul. 11, 2006

(65) Prior Publication Data
US 2007/0014515 A1 Jan. 18, 2007

(30) Foreign Application Priority Data
Jul. 12, 2005 (JP) .............................. 2005-202570

(51) Int. Cl.
G02B 6/26 (2006.01)
H04B 10/12 (2006.01)
(52) U.S. Cl. ......................... 385/27; 398/147
(58) Field of Classification Search .................. 385/24, 385/27, 31, 3, 9, 50, 52, 129, 147; 398/147
See application file for complete search history.

(56) References Cited

U.S. PATENT DOCUMENTS 6,775,434 B2 * 8/2004 Sugawara ..................... 385/27

FOREIGN PATENT DOCUMENTS

JP 10-221658 8/1998

* cited by examiner

Primary Examiner—Quyen Leung
(74) Attorney, Agent, or Firm—Antonelli, Terry, Stout & Kraus, LLP.

(57) ABSTRACT

The dispersion compensator with an etalon and a mirror arranged in parallel or at a slight angle with respect to each other is constructed so that emitted light from a collimator is reflected by the etalon multiple times and then enters another collimator. The dispersion compensator also has dispersion compensating units that change temperature using a heater or equivalent in order to render the amount of dispersion variable. In addition, these dispersion compensating units are provided in multi-stage form, and the angle of the mirror, the amplitude reflectance of the etalon, and temperature are optimized to offer polygonal dispersion characteristics. This realizes a practical, variable dispersion compensator suitable for a wavelength division multiplex optical transmission system and capable of shifting a variable amount of dispersion to the plus or minus side.

18 Claims, 25 Drawing Sheets

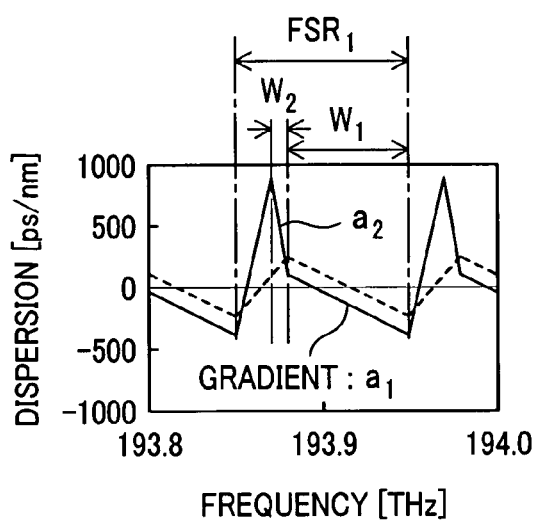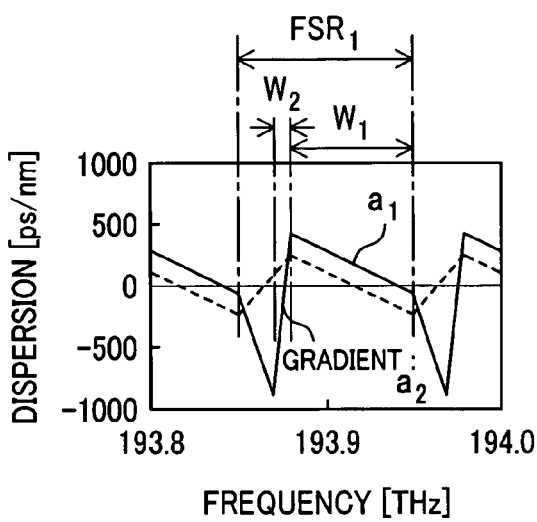

FIG.31A
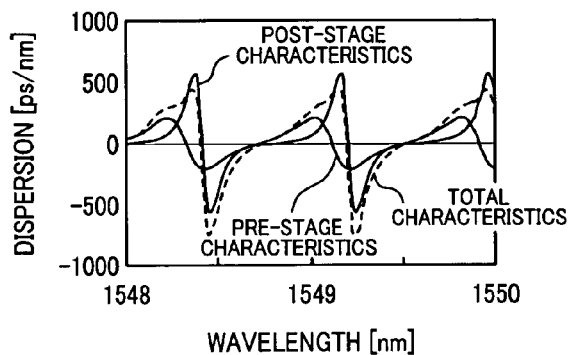
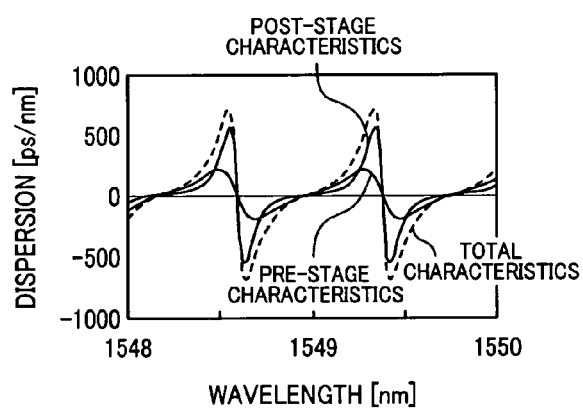
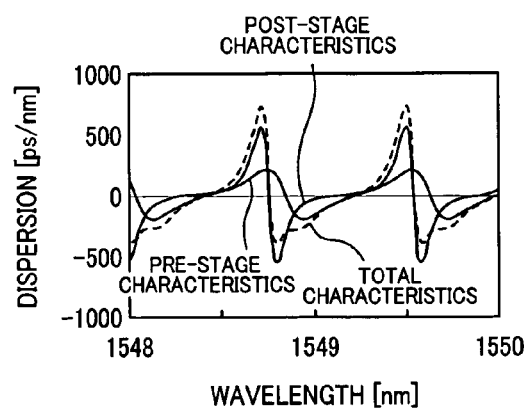
FIG.31B
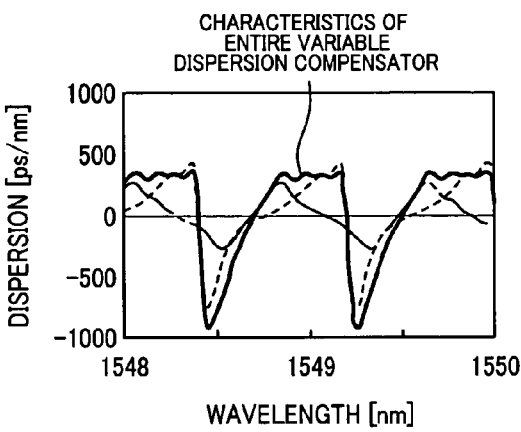
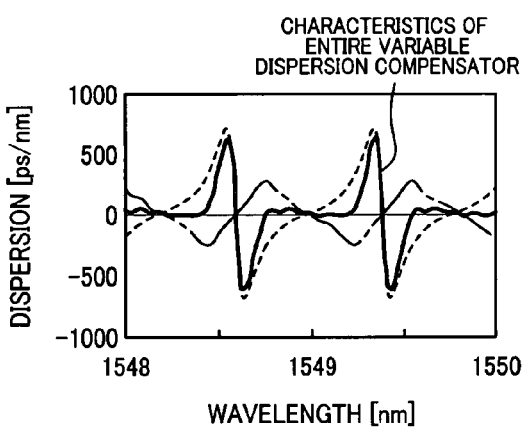
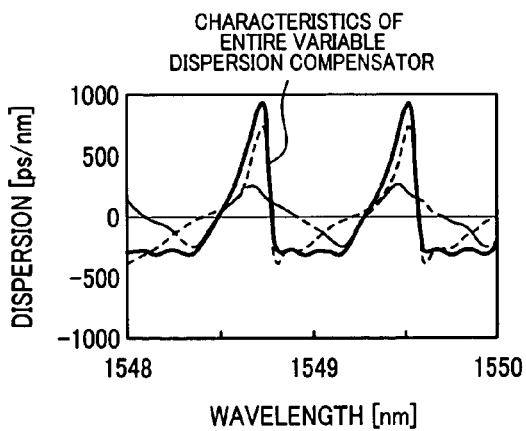

VARIABLE DISPERSION COMPENSATOR

CROSS-REFERENCE TO RELEVANT APPLICATION

The disclosure of the patent application Ser. No. 11/177,372, filed on Jul. 11, 2005, pending in THE UNITED STATES PATENT AND TRADEMARK OFFICE, has been incorporated by reference into the present application.

CLAIM OF PRIORITY

The present application claims priority from Japanese application JP 2005-202570 filed on Jul. 12, 2005, the content of which is hereby incorporated by reference into this application.

FIELD OF THE INVENTION

The present invention relates to variable dispersion compensators, and more particularly, to an optical dispersion compensator suitable for application to optical transmission systems employing an optical fiber, and systems employing an optical transmission scheme based on wavelength division multiplexing.

BACKGROUND OF THE INVENTION

Research and development activities on the long-distance optical transmission systems that use optical amplifiers as repeaters, have been actively performed in recent years. The enhancement of capacity by wavelength division multiplexing (WDM) intended for division-multiplexing a plurality of optical signals with different wavelengths into one optical fiber that forms a communications transmission line is considered to be a technique effective in providing Internet-based multimedia services, in particular. In these long-distance optical transmission systems, transmission speeds and transmission distances are greatly limited by the wavelength dispersion of the optical fiber. The wavelength dispersion is an event in which optical signals with different wavelengths are propagated through the optical fiber at different speeds. Since the optical spectra of the optical signals which have been modulated at high speed contain different wavelength components, these components are affected by the wavelength dispersion occurring during the propagation through the optical fiber and each component reaches a receiver at the different time of day. As a result, the optical signals suffer waveform distortion after being transmitted through the fiber.

The technique of dispersion compensation becomes important to suppress waveform deterioration due to such dispersion. Dispersion compensation is a method of canceling the wavelength dispersion characteristics of the optical fiber, and thus preventing waveform deterioration, by disposing at an optical transmitter, receiver, repeater, or the like, an optical element that has wavelength dispersion characteristics inverse to those of the optical fiber used as the transmission line. The research and development of the devices having inverse dispersion characteristics, such as dispersion-compensating fibers and optical fiber gratings (e.g., the grating described in Japanese Patent Laid-open No. 10-221658), have heretofore been conducted to obtain dispersion compensators. The above-mentioned optical element is one such example.

Dispersion tolerance indicates the range of the residual dispersion which satisfies certain transmission quality standards (i.e., the total amount of optical dispersion of the transmission line fiber and the dispersion compensator). Since dispersion tolerance decreases in inverse proportion to the second power of the bit rate of optical signals, the dispersion compensation technique becomes more important as the transmission speed increases. For example, in a 10-Gbps transmission system, the dispersion tolerance of optical signals is about 1000 ps/nm, so in consideration of the fact that the amount of dispersion of a single-mode fiber (SMF) is about 17 ps/nm/km, the system can transmit light only through a distance up to about 60 km without using the dispersion compensation technique. The dispersion tolerance in 40-Gbps transmission is as small as about 60 ps/nm, that is, about $\frac{1}{16}$ of the above, and an SMF transmission distance achievable at this tolerance level is up to about 4 km.

The transmission distances of the current trunk transmission lines which use optical repeaters are from several tens of kilometers to several thousands of kilometers, and thus the amount of dispersion of the dispersion compensator used needs to be changed according to the particular transmission distance. The dispersion compensation method that has been adopted for a 10-Gbps transmission system, for example, is by, for instance, providing beforehand a dispersion compensator whose amount of dispersion can be fixed in increments from 100 ps/nm to several hundreds of ps/nm, and then determining the appropriate amount of dispersion according to transmission distance during installation. A typical method of constructing the dispersion compensator in this example is by using the dispersion compensation fiber having a wavelength dispersion of a sign inverse to that of the transmission line. Likewise, a dispersion compensator whose amount of dispersion compensation can be changed in increments from 10 ps/nm to several tens of ps/nm is considered to be necessary for a 40-Gbps transmission system. In addition, in this case, changes in the amount of dispersion compensation with changes in the temperature of the transmission line fiber cannot be ignored. Accordingly, a dispersion compensator with a variably controllable amount of dispersion becomes necessary.

SUMMARY OF THE INVENTION

The above-described conventional dispersion compensators, however, pose various problems. To conduct a fixed amount of dispersion compensation, a dispersion compensation fiber as long as from several kilometers to several hundreds of kilometers is required, which increases the fiber accommodation space required. Also, an extra optical amplifier is likely to be needed to compensate for the loss of light in the dispersion compensation fiber. Additionally, since the dispersion compensation fiber is usually small in mode field diameter, the fiber produces a significant optical-fiber non-linear effect and is thus likely to distort transmission waveforms.

In optical-fiber gratings, a ripple with respect to wavelength is present in their beam-pass-through characteristics and wavelength dispersion characteristics, and the ripple greatly varies compensation characteristics, even for a slight change in wavelength. It is therefore known that when used for dispersion compensation, these gratings are inferior to dispersion compensation fibers in transmission characteristics. Also, there are manufacturing-associated problems in that gratings large in the amount of dispersion or wide in wavelength band cannot be easily produced and in that gratings narrow in band require the stabilization of temperature and wavelength. In addition, with a dispersion compensation fiber, the amount of dispersion cannot be continuously made variable in terms of principle, and this makes it difficult to realize the variable dispersion compensation that continuously changes the amount of dispersion according to the particular change in the amount of dispersion in the transmission line.

A dispersion-compensated transmission scheme in which a chirped grating is generated by, for example, producing a temperature gradient in the longitudinal direction of an optical-fiber grating, as in the above-described invention, has been proposed as a method of realizing continuous variable dispersion compensation using an optical-fiber grating. In this example, the variable amount of dispersion compensation can be conducted by controlling the temperature gradient. This scheme, however, has problems associated with its practical use, because a uniform temperature gradient is difficult to obtain and thus because sufficient dispersion compensation performance cannot be obtained for reasons such as the occurrence of a ripple in wavelength dispersion.

Problems concerning the variable range of a dispersion compensator are discussed next. In the schemes that employ ring resonators or etalons, the wavelength (frequency) characteristics of dispersion have a period called "FSR" (Free Spectral Range), and in the FSR, the average value of dispersion is zero. For a dispersion compensator that includes a combination of these resonators, therefore, although the variable range of dispersion quantities can be easily made symmetrical with respect to plus/minus directions, it is difficult to make this range plus/minus asymmetrical.

For high-speed transmission such as 40-Gbps transmission, however, there is a need, as described earlier, to change the variable amount of dispersion according to the particular difference in SMF transmission distance, and it is more practical to shift this variable range in a minus direction, rather than to make the range symmetrical with respect to plus/minus directions. For this reason, a dispersion compensator uses a compensation method based on a combination of fixed dispersion compensator and a variable dispersion compensator. This method, however, is disadvantageous in terms of both size and cost, since two compensators become necessary. Examples of transmission fibers include a non-zero dispersion shift fiber (NZDSF) in which the amount of dispersion is shifted in a minus direction in addition to SMF, but in this case a variable dispersion compensator having a variable range shifted in a plus direction is more effective for practical use.

An object of the present invention is to provide a variable dispersion compensator solving the above problems and minimizing not only a dispersion ripple, but also optical loss and a loss ripple, in a wide frequency band. Another object of the present invention is to provide a variable dispersion compensator effective for practical use, the compensator having a variable range shifted in either a plus or minus direction, not a plus/minus symmetrical range.

The above objects can be fulfilled by constructing a variable dispersion compensator including: a first variable dispersion-compensating unit that has, as its wavelength dispersion characteristics, a frequency period $FSR_1$, a frequency band $W_1$ almost approximated with a straight line of a gradient "$a_1$", and a gradient "$a_2$" of a line segment connecting a maximum point and minimum point of a wavelength dispersion characteristics curve in a band $W_2$ adjacent to the band $W_1$ in the $FSR_1$, and a variable dispersion control function for shifting the wavelength dispersion characteristics in a frequency axis; and a second variable dispersion-compensating unit that has, as its wavelength dispersion characteristics, a frequency period $FSR_2$, a frequency band $W_3$ almost approximated with a straight line of a gradient "$a_3$", and a variable dispersion control function for shifting the wavelength dispersion characteristics in the frequency axis; wherein the first variable dispersion-compensating unit and the second variable dispersion-compensating unit are cascade-connected, the band $W_1$ is greater than $W_2$, an absolute value of the gradient "$a_1$" is smaller than that of "$a_2$", the gradients "$a_1$" and "$a_3$" are opposite to each other in sign and essentially equal to each other in absolute value, a range of variable dispersion quantities in a plus direction is asymmetrical with respect to a range of variable dispersion quantities in a minus direction, and wavelength dispersion is assigned to one optical signal or to plural optical signals each of a different wavelength. For example, in the frequency band $W_3$, a deviation of the wavelength dispersion characteristics from the straight line of a gradient "$a_3$" is less than 5%. It is preferable for the above deviation to be less than 1%.

The first and second variable dispersion-compensating units here are both constructed of an etalon with a required reflectance, and a mirror with a reflection plane inclined at a required angle to a reflection plane of the etalon.

The present invention makes it possible to obtain a variable dispersion compensator that has characteristics of a wide frequency band, a low group-delay ripple, and a large variable amount of dispersion. This, in turn, allows simultaneous dispersion compensation of all optical signals during wavelength division multiplex (WDM) transmission, and thus the extension of a transmission distance in a transmission system.

Simultaneous dispersion compensation is also possible for higher-order dispersions, and the use of the dispersion compensator according to the present invention allows the construction of a simplified, inexpensive optical communications system that has excellent transmission characteristics.

BRIEF DESCRIPTION OF THE DRAWINGS

FIGS. 19A-19C is realized in an etalon oblique reflection scheme;

FIG. 29A is a diagram that shows polygonal line characteristics of the plus-side variable dispersion-compensating unit adapted to shift the variable dispersion characteristics of the variable dispersion compensator to the minus side;

FIG. 29B is a diagram that shows polygonal line characteristics of the plus-side variable dispersion-compensating unit adapted to shift the variable dispersion characteristics of the variable dispersion compensator to the plus side;

FIGS. 31A and 31B are diagrams that show polygonal line characteristics of the plus-side variable dispersion-compensating unit adapted to shift variable dispersion characteristics to the minus side, and also show dispersion characteristics of each compensating section to describe a method of controlling continuously the polygonal line characteristics of the plus-side variable dispersion-compensating unit adapted to shift variable dispersion characteristics to the plus side;

DESCRIPTION OF THE PREFERRED EMBODIMENTS

Embodiments of the present invention will be described in detail hereunder using the accompanying drawings.

Figure 1:
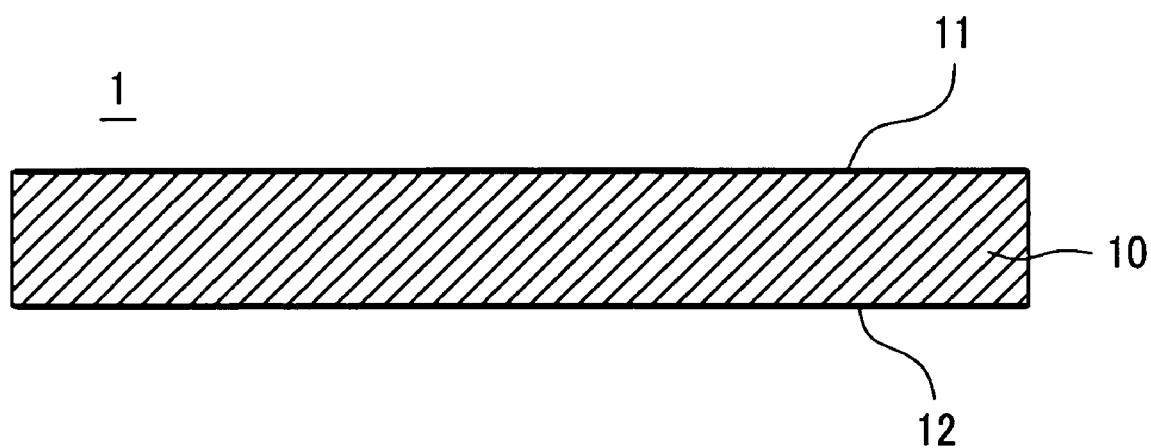
FIG. 1 illustrates an etalon which is a basic element of a variable dispersion compensator according to the present invention.

First, an etalon is described. A cross-sectional structure of the etalon is shown in FIG. 1. Reference number 1 denotes the etalon, which includes a precisely parallelized planar plate 10 having upper and lower faces coated with reflecting films 11, 12, respectively. Metal films made of gold, silver, or other high-reflectance metallic materials, dielectric multilayer films, or the like, are used as the reflecting films. In particular, an etalon having ideally an amplitude reflectance of 100% on one face is called the GT etalon, which was named after Gires and Tournois, the proposers. In reality, however, it is difficult to obtain an amplitude reflectance of 100%, so the reflecting films may be allowed to have an amplitude reflectance of at least about 90%. In addition, the amplitude reflectance of one reflecting film does not need to be too high when the film is to be used for dispersion compensation, and as a more specific value will be shown hereinafter, the amplitude reflectance does not exceed 90%. Since the GT etalon as mentioned above has a constant transmissivity with respect to wavelength, this etalon is alias called the all-pass filter. However, this etalon has wavelength (or frequency)-dependence on phase (or group delay time). The group delay time "$\tau$" at this time is represented by the following expression (1):

$$\tau = \frac{\Delta T(1 - r^2)}{1 + r^2 + 2r\cos(\omega \Delta T + \phi)} \quad (1)$$

where "r" denotes an amplitude reflectance, "$\omega$", an angular frequency of light, and "$\Delta T$", a round-trip delay of a etalon cavity. The angular frequency "$\omega$" has the relationship of $\omega=2\pi f$, where "f" denotes a frequency, and a wavelength $\lambda$ is expressed as $\lambda=c/f=2\pi c/\omega$ using a light velocity "c". Wavelength dispersion D is obtained by, as shown in expression (2), differentiating the group delay time "$\tau$" with the wavelength.

$$D = \frac{d\tau}{d\lambda} \quad (2)$$

Figure 2:
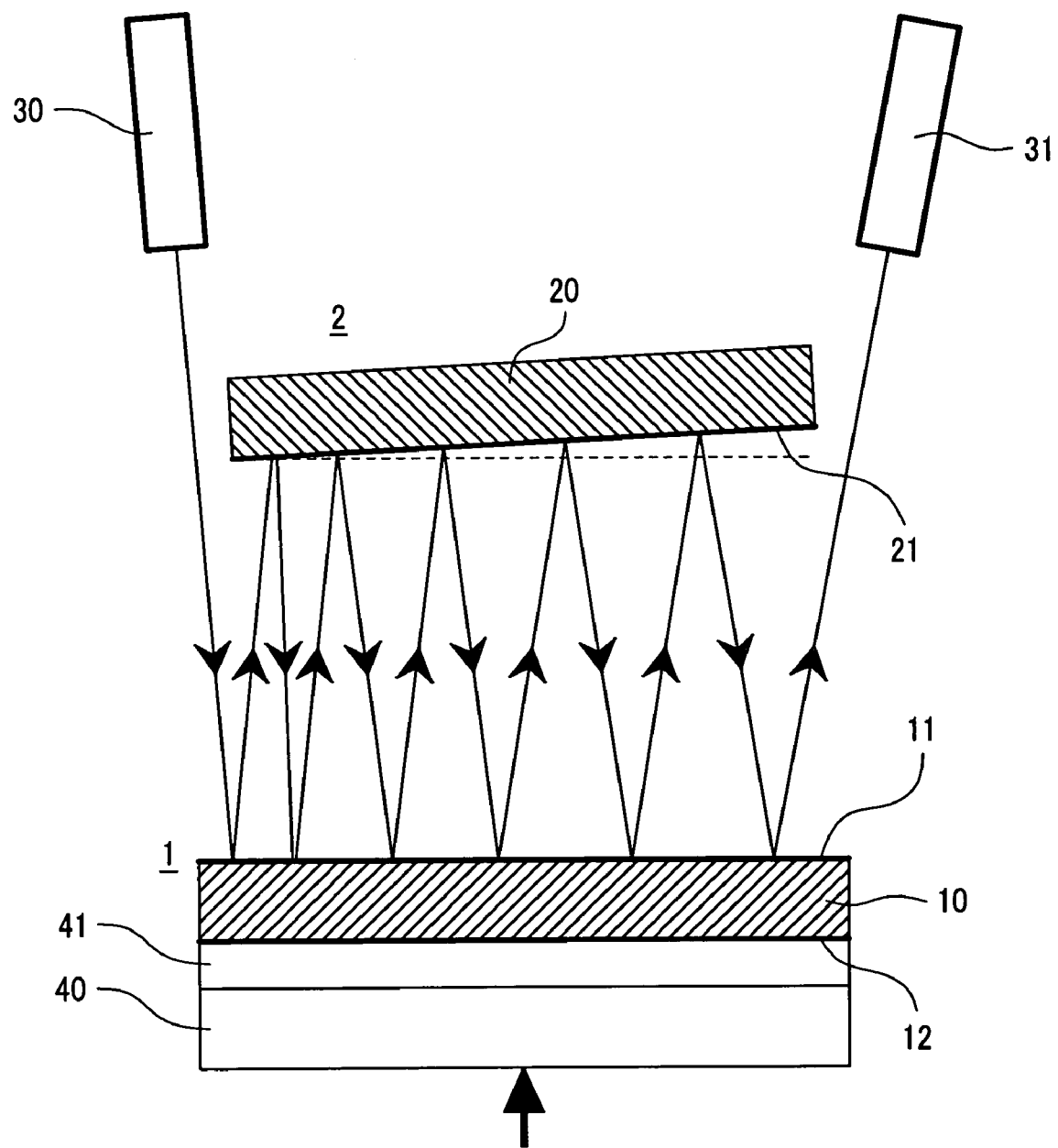
FIG. 2 is a diagram showing an example in which a mirror slightly angled with respect to the etalon is used to repeat reflection a plurality of times.

To obtain high-speed signals, especially for a dispersion compensator in a 40-Gbps long-distance optical transmission system, it is important to ensure a wide effective band of at least 40 GHz, a wide variable range, and a minimum dispersion ripple. To obtain desired dispersion compensator characteristics, therefore, it is effective to reflect the light a plurality of times using a mirror, as shown in FIG. 2. In a configuration diagram of FIG. 2, a mirror 2 (constituted by coating a mirror substrate 20 with a high-reflectance reflecting film 21) is disposed in parallel to or at a slight angle to the etalon 1 described above with reference to FIG. 1. As a more specific value will be shown hereinafter, if this angle is about 1 degree or less, an effective-band spreading effect based on the present invention can be obtained. Light that has been emitted from a collimator 30 reflects between the etalon 1 and the mirror 2 in an alternate fashion and then enters a collimator 31. The collimators refer to the optical components designed so that the light propagating through an optical fiber is spatially emitted as parallel beams. The etalon 1 can control its own temperature using a temperature-changing element 40 (e.g., a Peltier element or heater). In order to obtain a uniform heat distribution of the etalon at this time, a heat transfer material 41 is interposed between the temperature-changing element 40 and the etalon 1. A heat transfer sheet or thermal grease is used as the heat transfer material.

Figure 3A:
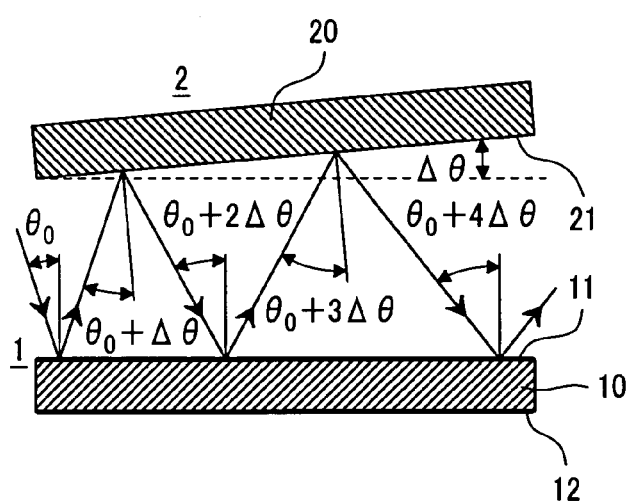
FIGS. 3A and 3B are reference diagrams that use numerical expressions to describe etalon-based group delay characteristics.
Figure 3B:
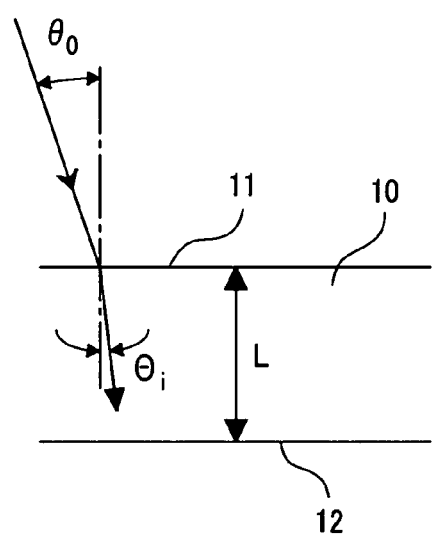

Based on numerical expressions, description of group delay characteristics is given using FIGS. 3A and 3B. If, as shown in FIG. 3A, an inclination angle of the reflecting film 21 of the mirror 2 with respect to the reflecting film 11 of the etalon 1 is taken as $\Delta\theta$, light that has entered at an incident angle $\theta_o$ with respect to the etalon 1 reflects on the mirror 2 an "i" number of times and then re-enters the etalon 1 at an angle of $\theta_i=\theta_o+2i\Delta\theta$. If total reflection from the mirror 2 is repeated a "k" number of times, a group delay time $\tau_{total}$ of the entire compensating unit can be calculated by repeatedly totaling a group delay time $\tau_i$ of the etalon during each reflection a (k+1) number of times. Expression (3) below shows the group delay time $\tau_{total}$.

$$\tau_{total} = \sum_{i=0}^{k} \tau_i \quad (3)$$

$$= \sum_{i=0}^{k} \frac{\Delta T_i(1 - r^2)}{1 + r^2 + 2r\cos(\omega \Delta T_i + \phi)}$$

where $\Delta T_i$ is the round-trip delay of the etalon cavity during each reflection. In consideration of incident angle $\Theta_i$ with respect to the etalon 1, as shown in FIG. 3B, $\Delta T_i$ is further represented by expression (4):

$$\Delta T_i = \frac{2nL\cos\Theta_i}{c} \quad (4)$$

where $\Theta_i$ is the angle of incidence on the etalon 1, "n" a refractive index, and L a spacing between the reflecting films of the etalon cavity. The relationship between the incident angle $\Theta_i$ within the etalon and the incident angle $\theta_i$ thereto is represented by numerical expression (5).

$$n \sin \Theta_i = \sin \theta_i \quad (5)$$

Figure 4:
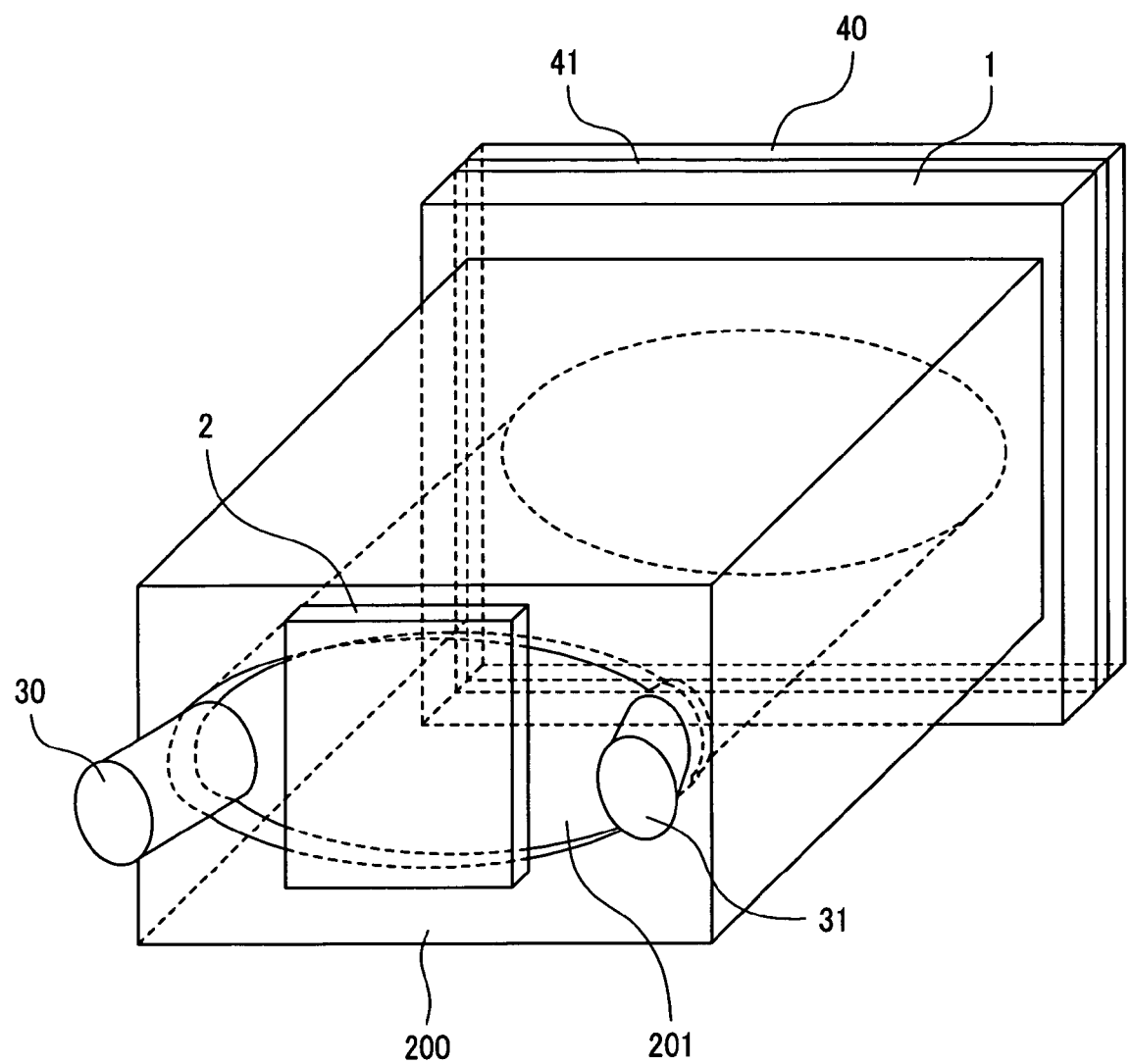
FIG. 4 is a perspective view showing an example of using an optical components fixing member to control and fix the etalon, mirror, and two collimators in the variable dispersion compensator of the present invention.
Figure 5:
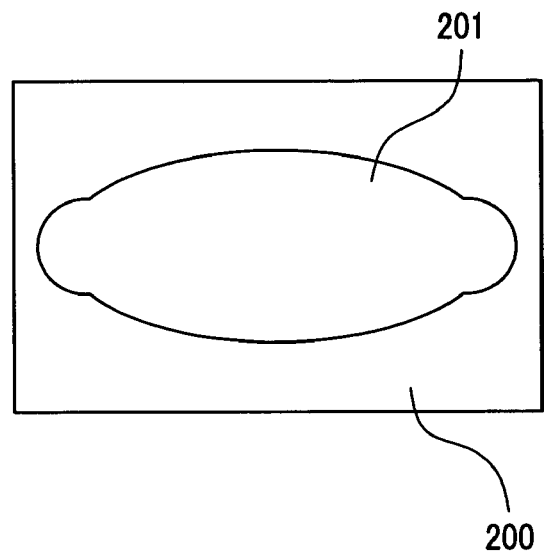
FIG. 5 is a top view of the optical components fixing member of FIG. 4.
Figure 6:
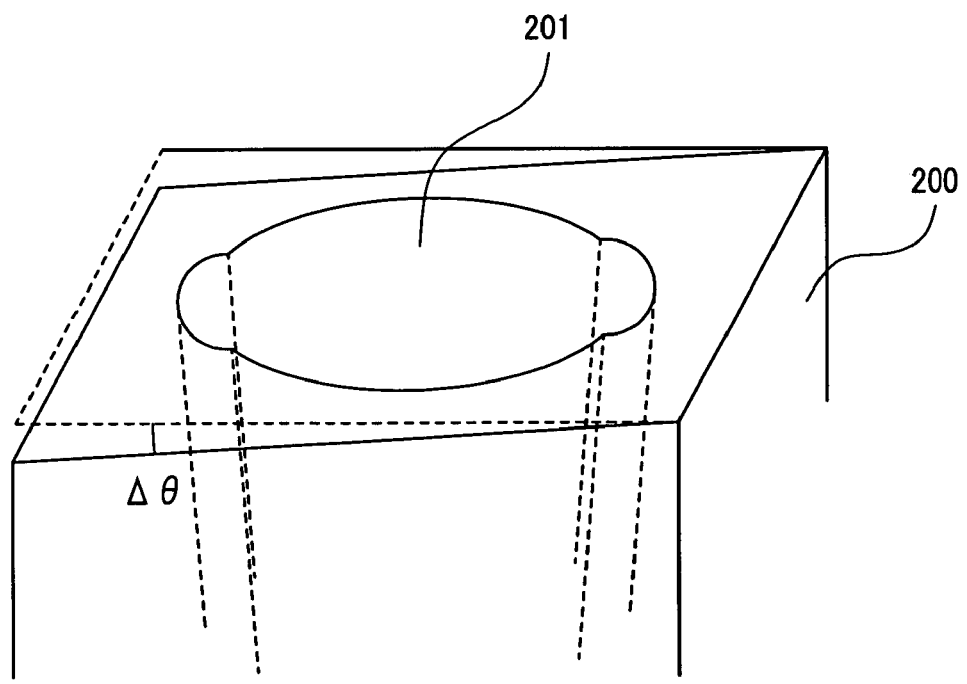
FIG. 6 is a perspective view showing an example of processing an upper face of the optical components fixing member in order to give an angle to the etalon and mirror of FIG. 4.

A method of controlling and fixing the etalon 1, the mirror 2, and the collimators 30, 31, by means of an optical components fixing member 200, is shown in FIG. 4. The optical components fixing member 200 here is realized using the metallic or glass material having a low thermal expansion coefficient. The optical components fixing member 200 is hollow and this member can be created by processing with an ultrasonic drill or the like. A top view of the optical components fixing member 200 is shown in FIG. 5, and an oblique top view of the optical components fixing member 200 is shown in FIG. 6. As shown in FIG. 5, a hollow hole 201 in the optical components fixing member 200 has such a shape as generated by combining three holes. One is an elliptical hole for passing a beam through when the beam reflects between the etalon 1 and the mirror 2, and the other two are essentially round holes for fixing the collimators 30, 31. Also, as shown in FIG. 6, the angle $\Delta\theta$ formed by the etalon 1 and the mirror 2 can be fixed in a precisely controlled condition by obliquely grinding an upper portion of the optical components fixing member 200. In addition, the angle of incidence, $\theta_o$, from the collimator 30 to the etalon 1, can be fixed in a precisely controlled condition by precisely processing the collimator-fixing holes in a manner similar to the above. These optical components are fixed using an adhesive such as a special one for optics.

Figure 7A:
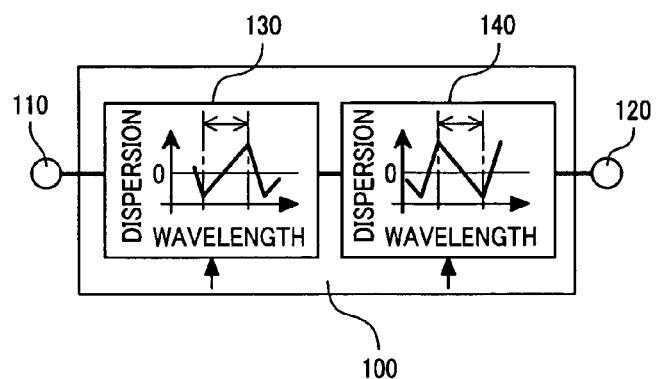
FIG. 7A is a diagram showing a basic configuration of the variable dispersion compensator of the present invention.
Figure 7B:
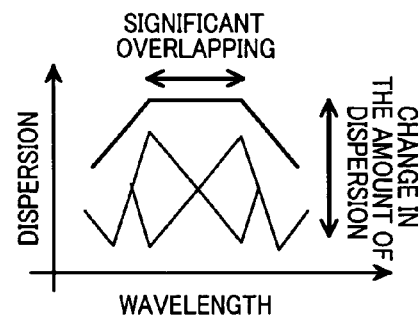
FIGS. 7B and 7C are diagrams schematically showing how the amount of dispersion changes during temperature control.
Figure 7C:
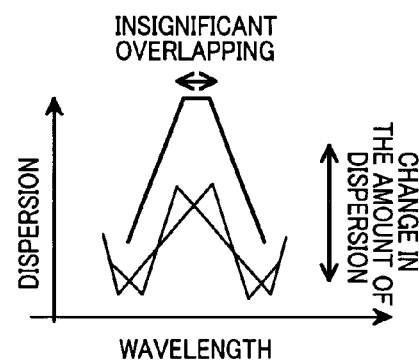

An example of a variable dispersion compensation scheme that uses temperature control is next described using FIGS. 7A, 7B and 7C. As shown in FIG. 7A, a variable dispersion compensator 100 has an input port 110 and an output port 120. Also, the variable dispersion compensator 100 is internally constituted by a plus-side variable dispersion-compensating unit (D+) 130 equivalent to the first variable dispersion-compensating unit, and a minus-side variable dispersion-compensating unit (D−) 140 equivalent to the second variable dispersion-compensating unit. The plus-side variable dispersion-compensating unit (D+) 130 and the minus-side variable dispersion-compensating unit (D−) 140 are cascade-connected to each other. These compensating units are realized by adopting the configuration shown in FIG. 2, that is, the configuration where the mirror 2 is disposed obliquely or in parallel to the etalon 1 and an exit laser beam from the collimator 30 is obliquely reflected a plurality of times. As shown in FIG. 7A, the plus-side variable dispersion-compensating unit 130 uses a linear function having a plus gradient in the relationship between dispersion and wavelength, whereas the minus-side variable dispersion-compensating unit 140 uses a linear function having a minus gradient. More specifically, the compensating units 130 and 140 use the single-dotted, arrow-marked sections of the plus and minus gradients. For these dispersion compensators, an average dispersion value becomes zero in the FSR.

When the temperature of the etalon is changed, thermal expansion of the etalon substrate changes resonance wavelength. For this reason, the dispersion characteristics curve shown in FIG. 7A shifts (translates) in a wavelength axis. For control of the resonance wavelength at this time, it is desirable that the etalon substrate be constructed of a glass member whose thermal expansion coefficient is $10^{-4}$ or less and not less than $10^{-6}$. Under the evaluation conditions that the present inventors applied, if the boron-silicated optical glass commonly used as optical glass is applied as the substrate material and this material has a thermal expansion coefficient of $0.87 \times 10^{-5}/°$ C., a temperature change of 60° C. is required for 100 GHz (in terms of optical wavelength, approx. 0.8 nm) of dispersion characteristics shifting. As a more specific value will be shown later, a preferable temperature control range is 5° C. or more since variable dispersion compensators require at least about 10 GHz of wavelength shifting per stage. While a glass material is used as the etalon in the present invention, using a material of a higher refractive index also makes it possible to reduce the etalon substrate thickness required for obtaining the same FSR, and further reduce the angle of incidence. The use of a high-refractive-index etalon having these characteristics further makes it possible to reduce the amount of positional shifting of an optical beam which has passed through and reflected from the etalon, and to reduce optical loss due to beam shifts associated with the number of reflections repeated during entrance/exit. It is therefore possible to increase the number of reflections repeated at the etalon, and to correspondingly augment the amount of dispersion. Silicon (Si) with a high refractive index of 3.5 can be used as a material transparent at wavelengths of 1 μm or more in an optical communications band, and using this material allows a low-loss high-dispersion variable dispersion compensator to be realized. In the present invention, the etalon is temperature-controlled to obtain variable dispersion characteristics by utilizing slight changes in thickness due to thermal expansion of the etalon. A variable dispersion compensator can likewise be realized by constructing an etalon with two parallel flat-plate mirrors and slightly changing an associated air gap by use of a piezoelectric element. Alternatively, the air gap may be rendered very small by inserting a refractive material between the parallel flat-plate mirrors to construct the etalon. The plus-side variable dispersion-compensating unit 130 and minus-side variable dispersion-compensating unit 140 here are adapted to be temperature-controllable independently of each other. Dispersion characteristics of the entire variable dispersion compensator at this time become equal to total dispersion characteristics of the two compensating units. This means, therefore, that as shown in FIG. 7B, if the linear section with the plus gradient and the linear section with the minus gradient significantly overlap each other, the characteristics curve takes a wide and low shape in an upper flat section. Conversely, as shown in FIG. 7C, if such overlapping is insignificant, the characteristics curve takes a narrow and high shape in the upper flat section. The amount of dispersion can be changed by controlling the temperatures of the plus-side and minus-side variable dispersion-compensating units in this way.

Figure 8:
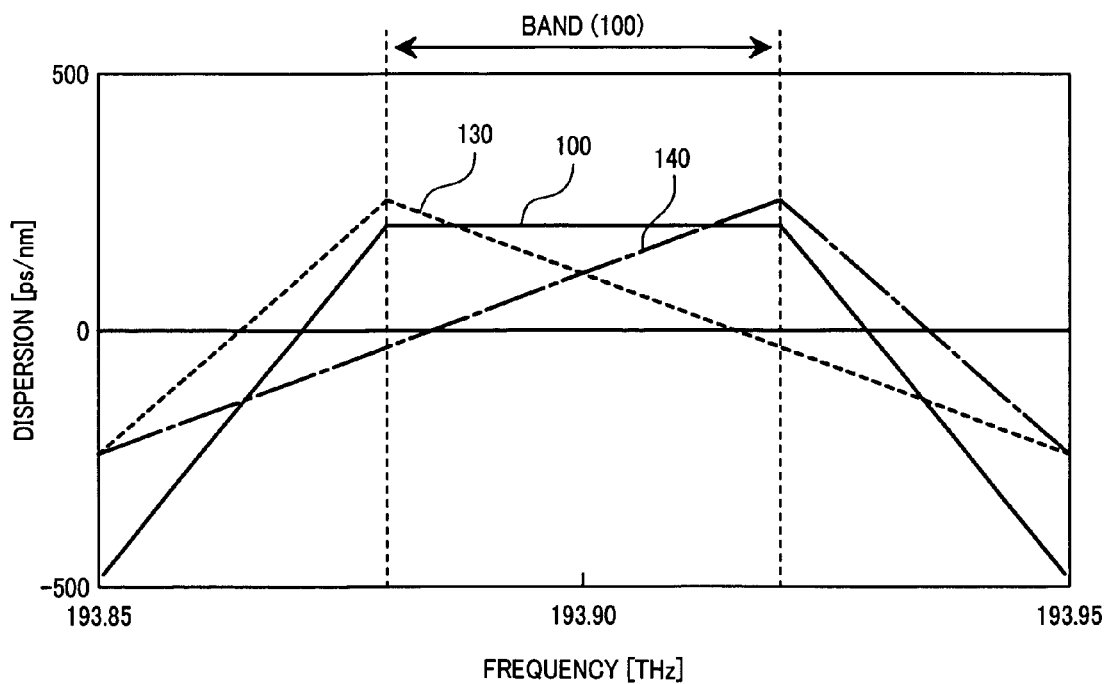
FIG. 8 is a diagram showing an example of the variable dispersion characteristics of the variable dispersion compensator that are achievable in the configuration of FIG. 7A.

FIG. 8 shows the relationship in dispersion characteristics between the plus-side variable dispersion-compensating unit (D+) 130, the minus-side variable dispersion-compensating unit (D−) 140, and the variable dispersion compensator 100 exhibiting the total dispersion characteristics of the two compensating units. One frequency period of dispersion characteristics data is shown in FIG. 8. In FIG. 8, the dispersion characteristics of the plus-side variable dispersion-compensating unit (D+) 130 are denoted by a broken line with the same reference number 130 as that of the compensating unit. Similarly, the dispersion characteristics of the minus-side variable dispersion-compensating unit (D−) 140 are denoted by a single-dotted line with the same reference number 140 as that of the compensating unit. Since a horizontal axis in FIG. 8 denotes frequency, linear sections of the two compensating units' dispersion characteristics curves have gradients with signs opposite to those of the gradients shown in FIG. 7A. The dispersion characteristics of the variable dispersion compensator 100, obtained by summing up the above two kinds of dispersion characteristics in that state, are denoted by a solid line 100 with the same reference number as that of the compensator. In FIG. 8, an effective band of the variable dispersion compensator 100 is regarded as a wavelength range in which flat dispersion characteristics are obtained.

Figure 9:
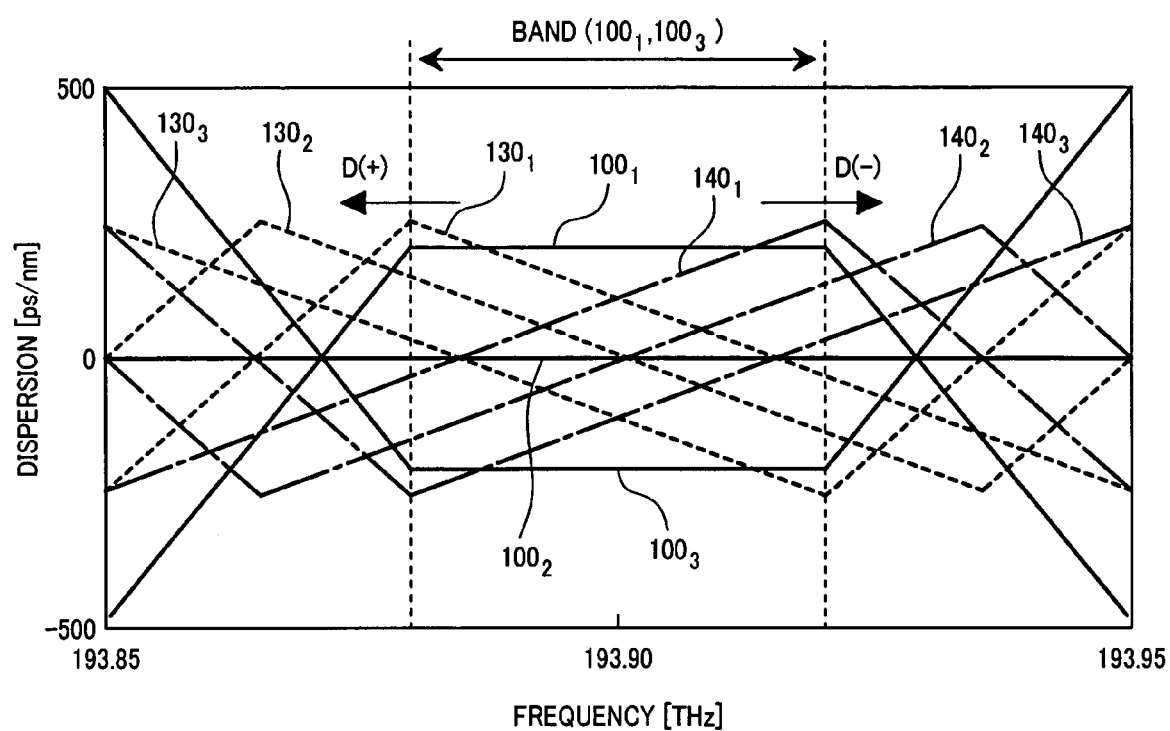
FIG. 9 is a diagram indicating that the variable dispersion characteristics of the variable dispersion compensator that are achievable in the configuration of FIG. 7A can be varied by temperature control.

FIG. 9 is a diagram explaining a more specific example of controlling the dispersion characteristics of the variable dispersion compensator 100 by temperature-controlling both the plus-side variable dispersion-compensating unit 130 and the minus-side variable dispersion-compensating unit 140. Increasing the temperature of the plus-side variable dispersion-compensating unit 130 for the dispersion characteristics thereof to shift towards an arrow of D(+) in FIG. 9 with respect to wavelength generates broken lines $130_1$, $130_2$, $130_3$. Conversely, reducing the temperature of the minus-side variable dispersion-compensating unit 140 for the dispersion characteristics thereof to shift towards an arrow of D(−) with respect to wavelength generates single-dotted lines $140_1$, $140_2$, $140_3$. Consequently, the dispersion characteristics of the variable dispersion compensator 100 change as shown with solid lines $100_1$, $100_2$, $100_3$.

As can be seen by contrast between FIGS. 8 and 9, when the respective dispersion characteristics of the plus-side variable dispersion-compensating unit 130 and minus-side variable dispersion-compensating unit 140 change from states of $130_1$, $140_1$ to states of $130_2$, $140_2$, the dispersion characteristics $100_1$ of the variable dispersion compensator 100 diminish to zero in the amount of dispersion. This state is shown as $100_2$. When the dispersion characteristics of the two compensating units further change to $130_3$ and $140_3$, respectively, both of the dispersion characteristics are reversed in plus/minus sign and the resulting dispersion characteristics $100_3$ of the variable dispersion compensator 100 become minus. It can be seen that when a certain effective band is defined in this way, the dispersion characteristics $100_1$ and $100_3$ become symmetrical with respect to plus/minus directions, that is, that the dispersion characteristics of the variable dispersion compensator 100 become plus/minus symmetrical.

As described earlier, it is preferable that in variable dispersion compensators effective for practical use, a wide variable range of dispersion quantities should be obtainable on the minus side or the plus side. For this reason, a method of shifting a variable range of dispersion quantities to either the plus or minus side in the present invention will be described below.

A concept of implementing a variable dispersion compensator capable of achieving a wide variable range of dispersion quantities on the minus side is first described using FIG. 29A. The broken line shown therein applies to the dispersion characteristics of the plus-side variable dispersion-compensating unit 130 that are shown in FIG. 7A, and the solid line shown in FIG. 29A applies to the concept of dispersion characteristics, based on the present invention. Since a horizontal axis in FIG. 29A denotes frequency, linear sections of the dispersion characteristics curve have gradients with signs opposite to those of the gradients shown in FIG. 7A. In a band $W_1$ of FIG. 29A, the characteristics of the plus-side variable dispersion-compensating unit 130 in terms of the amount of dispersion are shifted to the minus side first. However, since the dispersion (group delay time) characteristics of the compensating unit are represented by expressions (1) and (2), an average value of dispersion in the FSR necessarily becomes zero. Accordingly, in a range other than the band $W_1$, the amount of dispersion of the plus-side variable dispersion-compensating unit 130 significantly changes to the plus side. These facts indicate that the dispersion characteristics of the variable dispersion compensator can be shifted to the minus side by providing the polygonal line characteristics that generate gradients "$a_1$", "$a_2$" in the bands $W_1$, $W_2$, respectively, as shown in FIG. 29A. While the dispersion characteristics shown herein relate only to the plus-side variable dispersion-compensating unit 130, the minus-side variable dispersion-compensating unit 140 can likewise be adapted so as to obtain dispersion characteristics curves of a polygonal line shape.

Figure 10:
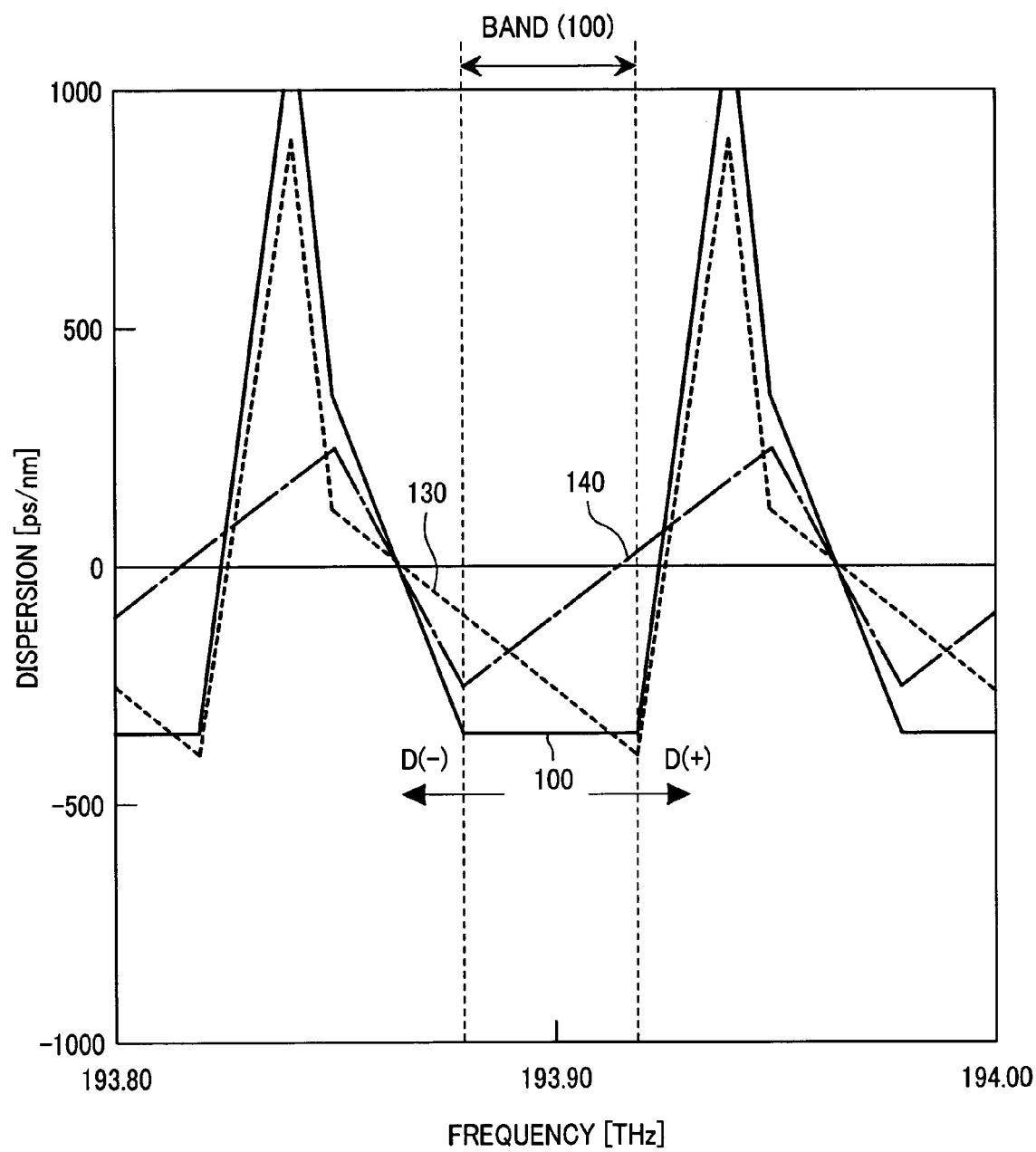
FIG. 10 is a diagram showing the characteristics of the dispersion compensator that are obtained on the assumption that a plus-side variable dispersion-compensating unit in an embodiment of the present invention has characteristics which shift the amount of dispersion significantly in a minus direction.

FIG. 10 is a diagram showing the relationship between frequency and the amount of dispersion obtainable when the dispersion compensator 100 is to be implemented using the above concept. Two frequency periods of dispersion characteristics data is shown in FIG. 10. Comparing the examples shown in FIGS. 8 and 10 allows one to see that in terms of characteristics 130 of the plus-side variable dispersion-compensating unit 130, the amount of dispersion is significantly shifted to the minus side in a band 100.

In the example of FIG. 10, characteristics 140 of the minus-side variable dispersion-compensating unit 140 are the same as in FIG. 8. As a result, the dispersion compensator 100 has a large amount of dispersion on the minus side in the band 100. In this example, either reducing the temperature of the plus-side variable dispersion-compensating unit 130 to shift the characteristics in a direction of D(+), increasing the temperature of the minus-side variable dispersion-compensating unit 140 to shift the characteristics in a direction of D(−), or controlling both temperatures makes it possible to increase the amount of dispersion of the dispersion compensator 100 (in FIG. 10, to change this amount of dispersion in an upward direction) similarly to the example described per FIG. 9. Comparing the examples of FIGS. 9 and 10 in terms of the same effective band allows one to see that in the former example, the amount of dispersion (associated with the characteristics $100_3$, $100_1$) is variably controllable in a range from −210 to +210 ps/nm, and that in the latter example, the amount of dispersion is variably controllable in a range from −355 to +65 ps/nm.

A concept of implementing a variable dispersion compensator capable of achieving a wide variable range of dispersion quantities on the plus side is next described using FIG. 29B. This example assumes that conversely to the above description, the dispersion characteristics of the plus-side variable dispersion-compensating unit 130 are significantly shifted to the plus side in terms of the amount of dispersion. In a band $W_1$ of FIG. 29B, the characteristics of the plus-side variable dispersion-compensating unit 130 in the amount of dispersion are shifted to the plus side first. As described previously, an average value of dispersion in the FSR in the dispersion compensator becomes zero. Accordingly, in a range other than the band $W_1$, the amount of dispersion in the plus-side variable dispersion-compensating unit 130 significantly changes to the minus side.

These facts indicate that the dispersion characteristics of the variable dispersion compensator can be shifted to the minus side or the plus side by providing the polygonal line characteristics that generate gradients "$a_1$", "$a_2$" in the bands $W_1$, $W_2$, respectively, as shown in FIG. 29A or 29B. While the dispersion characteristics shown herein relate only to the plus-side variable dispersion-compensating unit 130, the minus-side variable dispersion-compensating unit 140 can likewise be adapted so as to obtain dispersion characteristics curves of a polygonal line shape.

Figure 11:
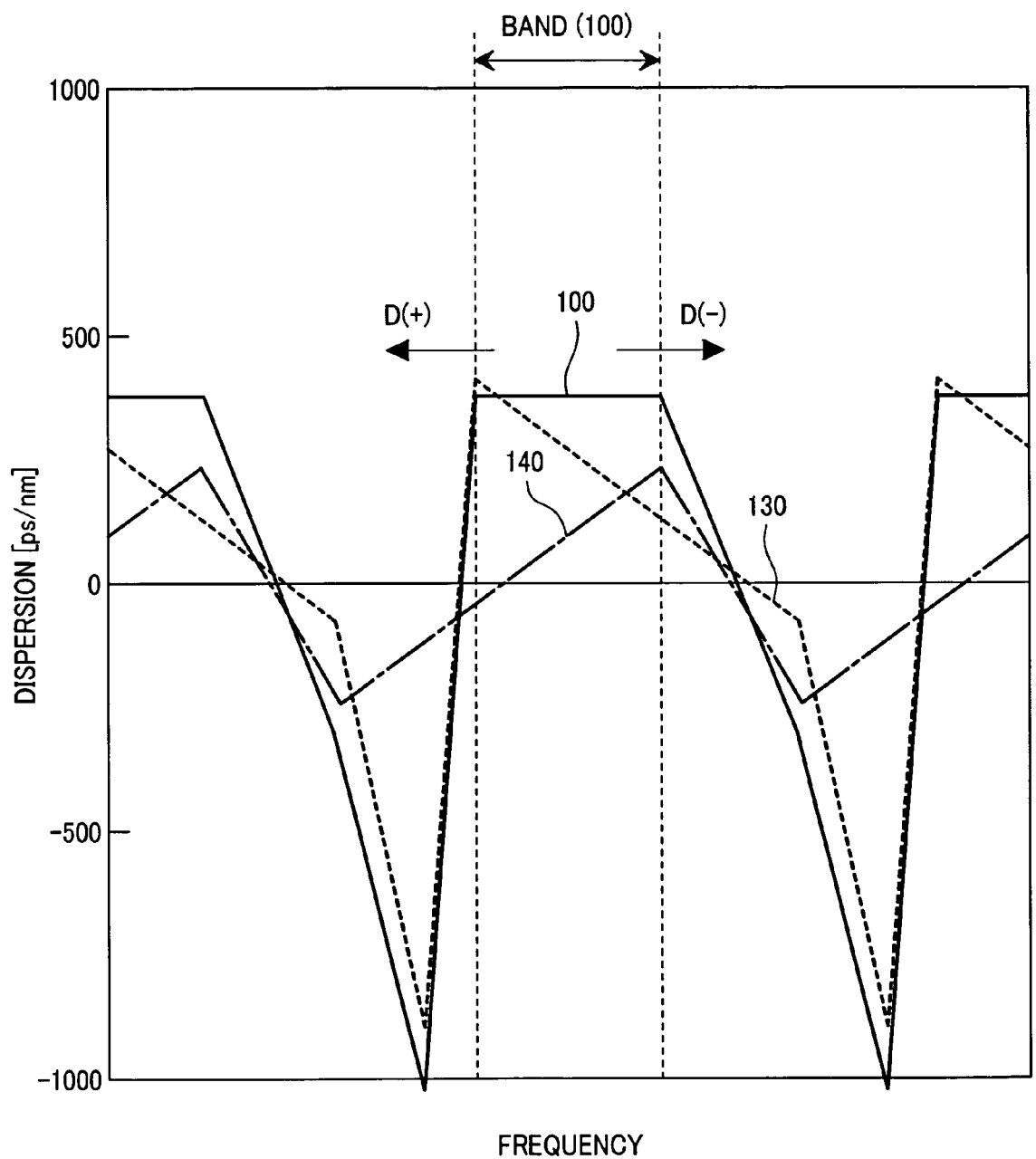
FIG. 11 is a diagram showing the characteristics of the dispersion compensator that are obtained on the assumption that the plus-side variable dispersion-compensating unit in the embodiment of the present invention has characteristics which shift the amount of dispersion significantly in a plus direction.

FIG. 11 is a diagram showing the relationship between frequency and the amount of dispersion obtainable when the dispersion compensator 100 is to be implemented using the above concept. Two frequency periods of dispersion characteristics data is shown in FIG. 11. Comparing the examples shown in FIGS. 8 and 11 allows one to see that in terms of characteristics 130 of the plus-side variable dispersion-compensating unit 130, the amount of dispersion is significantly shifted to the plus side in a band 100.

In the example of FIG. 11, characteristics 140 of the minus-side variable dispersion-compensating unit 140 are the same as in FIG. 8. As a result, the dispersion compensator 100 has a large amount of dispersion on the plus side in the band 100. In this example, either reducing the temperature of the plus-side variable dispersion-compensating unit 130 to shift the characteristics in a direction of D(+), increasing the temperature of the minus-side variable dispersion-compensating unit 140 to shift the characteristics in a direction of D(−), or controlling both temperatures makes it possible to reduce the amount of dispersion of the dispersion compensator 100 (in FIG. 11, to change this amount of dispersion in a downward direction) similarly to the example described per FIG. 9. Comparing the examples of FIGS. 9 and 11 in terms of the same effective band allows one to see that the amount of dispersion is variably controllable in a range from −210 to +210 ps/nm in the former example, and in a range from −40 to +380 ps/nm in the latter example.

It is possible, by thus causing the amount of dispersion to be shifted to the plus or minus side in an effective band and to be significantly changed to the minus or plus side in a range other an effective band, to realize the plus-side variable dispersion-compensating unit 130 taking an average dispersion value of zero. Combining this compensating unit 130 and the minus-side variable dispersion-compensating unit 140 makes it possible to achieve the dispersion compensator 100 that shifts the amount of dispersion to the plus or minus side in the effective band. A more specific example of a configuration of the plus-side variable dispersion-compensating unit 130 shifting the amount of dispersion to the plus or minus side in the effective band will be described next.

Figures 12A, 12B, 12C:
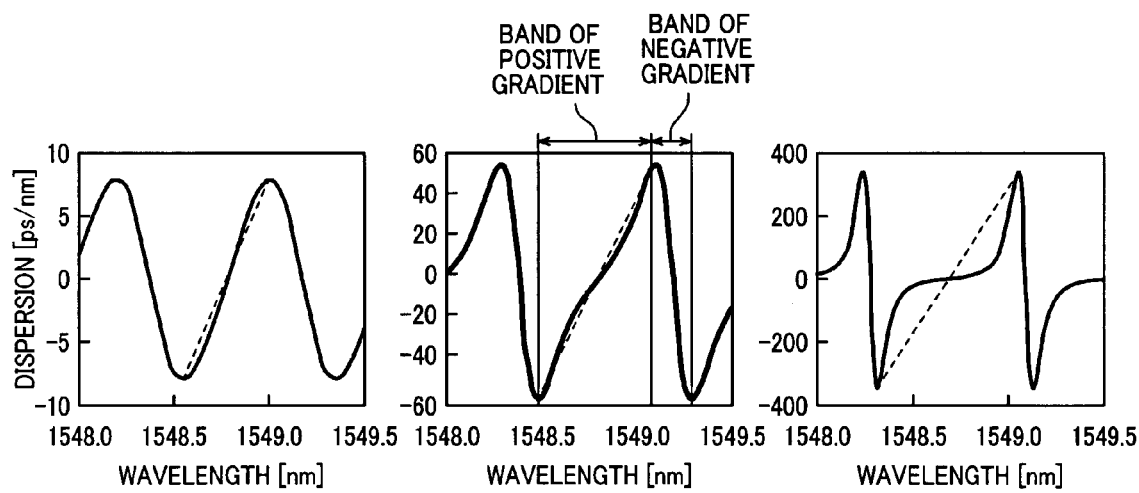
FIGS. 12A-12C are diagrams showing the different independent dispersion characteristics that the etalon, as a basic element of the variable dispersion compensator according to the present invention, exhibits when the etalon has different values as its amplitude reflectance "r"

A method for optimizing the angle $\Delta\theta$ of the mirror 2 with respect to the etalon 1, and the amplitude reflectance "r" thereof, is discussed first. In order to implement the optimization, the independent dispersion characteristics that the etalon alone exhibits when the amplitude reflectance "r" differs are described first. If, in expression (3), k=0 and "r"=5%, 26%, and 58%, respective dispersion characteristics with respect to wavelength are obtained as in FIGS. 12A, 12B, and 12C. For "r"=5% in FIG. 12A, amplitude of dispersion is small and an associated curve takes a shape close to a sine function. For "r"=26% in FIG. 12B, the amplitude of dispersion is slightly larger than in FIG. 12A and an associated curve takes a shape close to a triangular waveform. This shape indicates characteristics close to the characteristics of the plus-side variable dispersion-compensating unit 130 that were described earlier with reference being made to FIG. 8. In the following description, the curve is divided into a section having a plus gradient, and a section having a minus gradient. In addition, a range in which the dispersion changes from a minimum to a maximum will be called the "band of a plus gradient," and a range in which the dispersion changes from a maximum to a minimum will be called the "band of a minus gradient." For "r"=58% in FIG. 12C, the amplitude of the dispersion is augmented and the linear section shown in FIG. 12B has a distorted shape. The portion denoted by a broken line in FIG. 12B is a line that connects plus and minus peaks of the dispersion in a region equivalent to the band of the plus gradient. In FIGS. 12A-12C, although all horizontal axes denote wavelength on the same scale, vertical axes denote the amount of dispersion on different scales.

As can be seen from FIGS. 12A-12C, dispersion compensators using a GT etalon exhibit wavelength (or frequency) periodicity in group delays and dispersion characteristics. This period is expressed as FSR, which is 100 GHz (approx. 0.8 nm) in FIGS. 12A-12C. It is particularly effective in wavelength division multiplex (WDM) transmission to provide such frequency periodicity. If FSR is made equal to the wavelength interval in WDM transmission, the GT etalon can provide essentially the same advantageous effects to signals of all wavelengths. Therefore, such a dispersion compensator is very effective in a WDM optical transmission system.

With the above-described properties in view, a description is given below of a configuration for realizing a plus-side variable dispersion-compensating unit 130 whose wavelength dispersion characteristics are shifted to the minus side in the present invention.

Figure 13A:
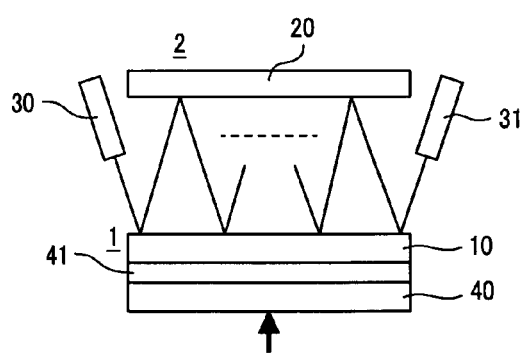
FIG. 13A is a diagram showing an example of a configuration in which the mirror and the etalon are arranged in parallel in opposed form with respect to each other in order to reflect a beam bidirectionally for increased amounts of dispersion.
Figure 13B:
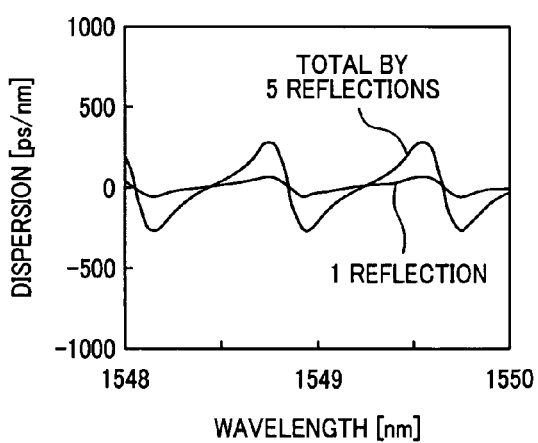
FIG. 13B is a diagram showing the dispersion characteristics that increase the amount of dispersion as the number of reflections is increased.

First, an etalon with an amplitude reflectance "r" of about 26% (as can be seen from FIG. 12B, such an etalon has high linearity in inclined sections of a plus gradient) is used to reflect a beam repeatedly in two directions for increased amounts of dispersion by opposing a mirror 2 and the etalon 1 in parallel as shown in FIG. 13A. The dispersion characteristics obtained at this time are shown in FIG. 13B. As can be seen from FIG. 13B showing an overlapped representation of the amount of dispersion in one reflection and the total amount of dispersion in five reflections, increasing the number of reflections increases the amount of dispersion while at the same time steepening the inclined sections of the plus gradient. This, however, does not mean that as can be easily seen from FIG. 13B, the dispersion characteristics have been shifted to the minus side, and the amount of dispersion is zero when averaged in the FSR.

Figure 14A:
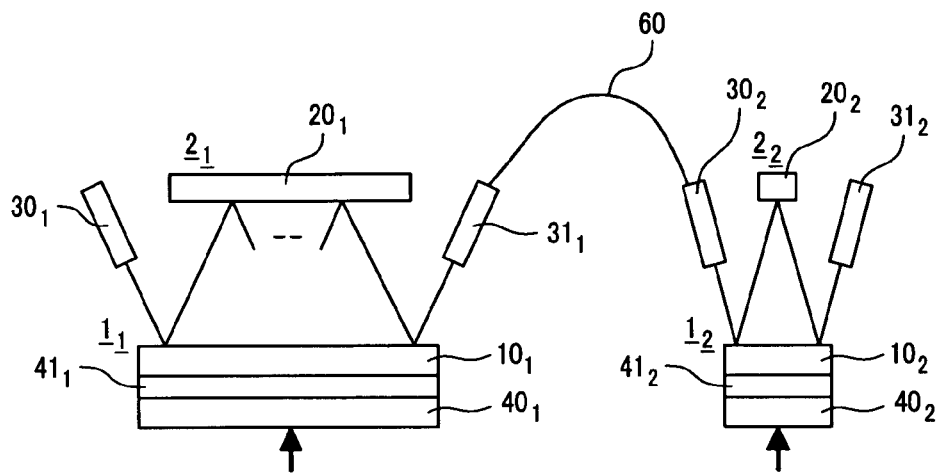
FIG. 14A is a diagram showing a structure in the embodiment of the present invention where a post-compensating section with a first mirror and a first etalon arranged in parallel in opposed form with respect to each other is provided at a stage which succeeds a pre-compensating section including a second mirror opposed to a second etalon.

Next, as shown in FIG. 14A, a post-compensating section with a mirror $2_2$ opposed to an etalon $1_2$ in parallel is provided at a stage which follows the pre-compensating section shown in FIG. 13A, the pre-compensating section having a mirror $2_1$ opposed to an etalon $1_1$ in parallel. The post-compensating section assumes that the etalon $1_2$ has a high amplitude reflectance (e.g., r≈58%). For example, if reflection is repeated five times, the dispersion characteristics obtained in the pre-compensating section will be equal to a total of the five reflections, shown in FIG. 13B. This state is shown in a top row of FIG. 14B. The output light obtained in a collimator $31_1$ is introduced into a collimator $30_2$ of the post-compensating section through a fiber 60. Since the post-compensating section assumes that the etalon $1_2$ has a high amplitude reflectance (e.g., r≈58%), the dispersion characteristics obtained in the post-compensating section exhibit sharp peaks as shown in FIG. 12C. This state is shown in a middle row of FIG. 14B. However, in order for the dispersion characteristics of the plus-side variable dispersion-compensating unit 130 to be shifted to the minus side at the above phase, the peaks of the dispersion characteristics of the post-compensating section are shifted to the shorter-wavelength side shown as a broken-line portion in FIG. 14B. The shifting of the peaks to the shorter-wavelength side can be accomplished by exercising control for reduced temperature of the etalon $1_2$, as described referring to FIG. 9. The dispersion characteristics obtained by totaling the dispersion characteristics of the pre-compensating section and the dispersion characteristics of the post-compensating section that have been shifted to the minus side are shown in a bottom row of FIG. 14B. FIG. 14C is a graph on which the three kinds of characteristics in FIG. 14B are represented in overlapped form.

Figure 14B:
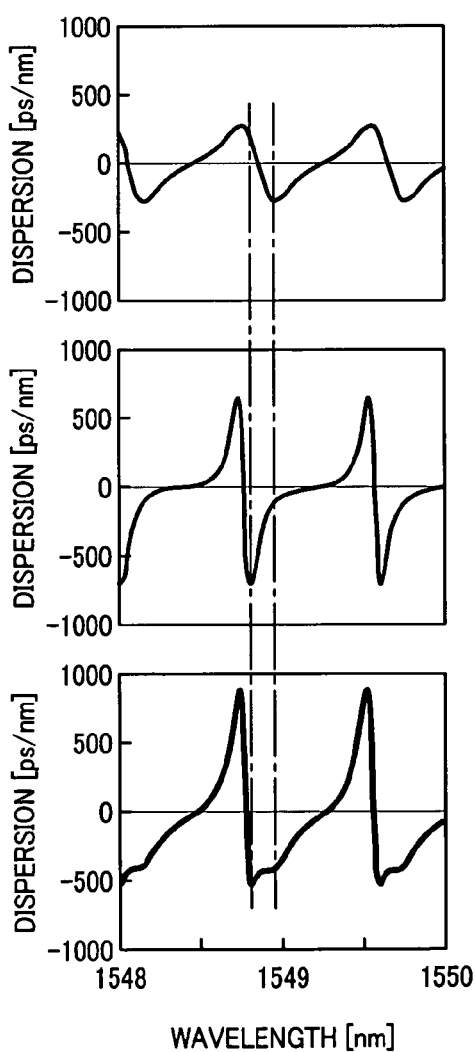
FIGS. 14B and C are diagrams explaining the dispersion characteristics obtained in the twin-stage structure.
Figure 14C:
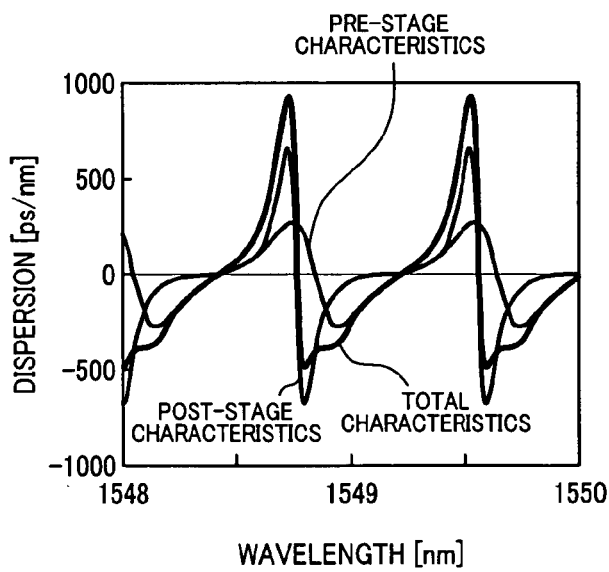

It can be seen, by contrast between the characteristics shown in the bottom row of FIG. 14B (these characteristics are the same as the total characteristics of FIG. 14C) and a broken line 130 denoting the characteristics of the plus-side variable dispersion-compensating unit (D+) 130, that the plus-side variable dispersion-compensating unit (D+) 130 having dispersion characteristics shifted to the minus side has been realizable in the configuration of FIG. 14A. However, these dispersion characteristics are reversed in a horizontal direction because the horizontal axes in FIGS. 10 and 14C denote frequency and wavelength, respectively, and because the frequency and the wavelength are in a relationship of inverse proportion. Light is passed through the collimator $30_1$, the etalon $1_1$, the collimator $31_1$, the collimator $30_2$, the etalon $1_2$, and the collimator $31_2$, in that order. The same results, however, can also be obtained by reversing the above order, that is, by passing the light through the collimator $31_2$, the etalon $1_2$, the collimator $30_2$, the collimator $31_1$, the etalon $1_1$, and the collimator $30_1$, in that order.

Next, a description is given below of a method of realizing a plus-side variable dispersion-compensating unit (D+) 130 whose wavelength dispersion characteristics are shifted to the plus side in the same configuration as that of FIG. 14A. The same characteristics as those obtained in FIG. 13B by totaling five reflections in a pre-compensating section are shown in a top row of FIG. 30A. Similarly, a post-compensating section assumes an etalon $1_2$ with a high amplitude reflectance (e.g., r≈58%), and the dispersion characteristics obtained in the post-compensating section exhibit those sharp peaks that are shown in FIG. 12C. This state is shown in a middle row of FIG. 30A. However, in order for the dispersion characteristics of the plus-side variable dispersion-compensating unit 130 to be shifted to the plus side, the peaks of the dispersion characteristics of the post-compensating section are shifted to a greater-wavelength side. The shifting of the peaks to the greater-wavelength side can be accomplished by exercising control for higher temperature of the etalon $1_2$, as described referring to FIG. 9. The dispersion characteristics obtained by totaling the dispersion characteristics of the pre-compensating section and the dispersion characteristics of the post-compensating section that have been shifted to the minus side are shown in a bottom row of FIG. 30A. FIG. 30B is a graph on which the three kinds of characteristics in FIG. 30A are represented in overlapped form.

Figure 30A:
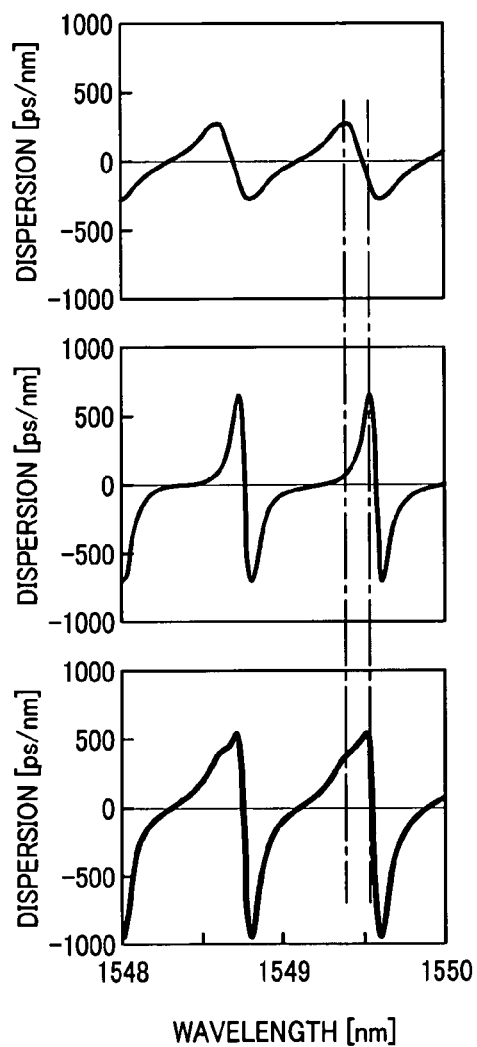
FIGS. 30A and 30B are diagrams showing the characteristics that each compensating section exhibits when the plus-side variable dispersion-compensating unit for shifting variable dispersion characteristics to the minus side is realized in a twin-stage configuration.
Figure 30B:
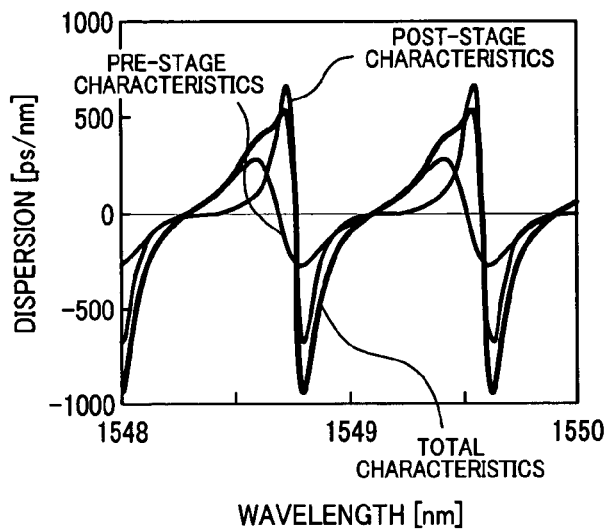

It can be seen, by contrast between the characteristics shown in the bottom row of FIG. 30A (these characteristics are the same as the total characteristics of FIG. 30B) and the characteristics of the plus-side variable dispersion-compensating unit (D+) 130 indicated with a broken line 130 in FIG. 11, that the plus-side variable dispersion-compensating unit (D+) 130 having dispersion characteristics shifted to the plus side has been realizable in the configuration of FIG. 30A. However, these dispersion characteristics are reversed in a horizontal direction because the horizontal axes in FIGS. 11 and 30B denote frequency and wavelength, respectively, and because the frequency and the wavelength are in a relationship of inverse proportion.

Figure 15:
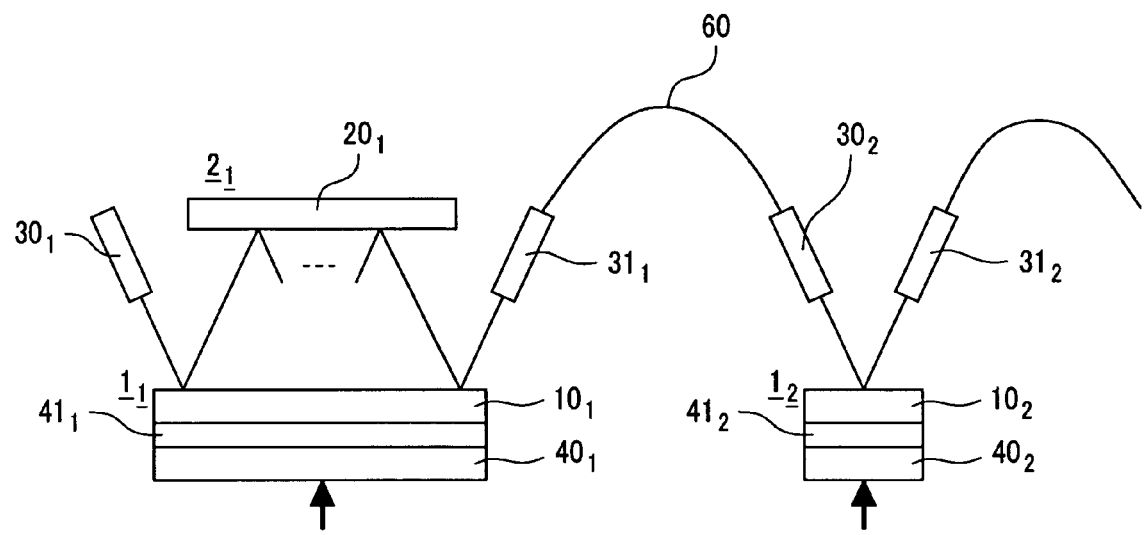
FIG. 15 is a diagram showing a structure not including the mirror of the post-compensating section shown in FIG. 14A.
Figure 16:
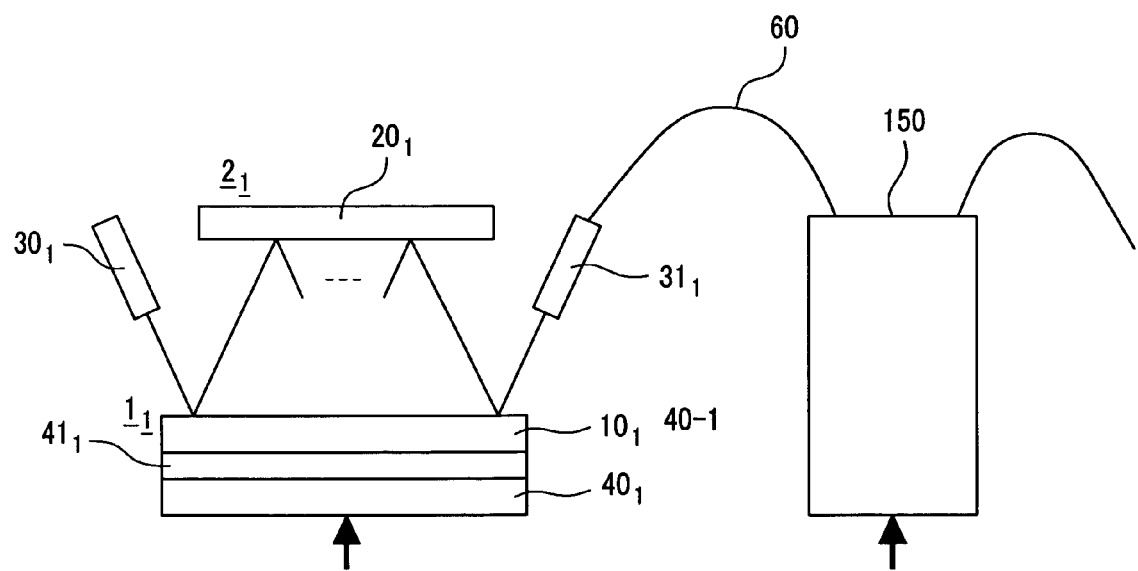
FIG. 16 is a diagram explaining that the post-compensating section of FIG. 14A can take various configurations.

The number of reflections at the etalon of a high amplitude reflectance may be limited only to one time in the configuration of FIG. 14A. In that case, the mirror $2_2$ becomes unnecessary since the beam is not reflected multiple times at the etalon $1_2$. A configuration without the mirror $2_2$ is shown in FIG. 15. Additionally, further developing this concept permits such a post-compensating section to use an element other than an etalon. A configuration in this case is shown in FIG. 16. Although a pre-compensating section is the same as that shown in FIG. 14A, a post-compensating section 150 can use an element relatively narrow in band. For example, it is possible to use a conventional optical-fiber grating, a multi-cavity etalon, a ring cavity, a photonic crystal, or a photonic crystal fiber.

Figure 17A:
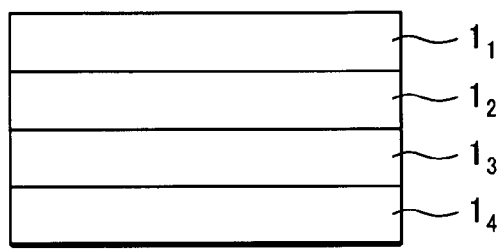
FIGS. 17A-17C are diagrams that show structural examples of a multi-cavity etalon and temperature control.

The multi-cavity etalon here refers to an etalon having such a multiple-resonance structure as shown in FIG. 17A. In FIG. 17A, etalons $1_1$-$1_4$ are formed into a four-layer stacked structure. That is to say, in this structure, multiple etalons are stacked on one another, each with the planar plate 10 of FIG. 1 and with a reflecting film on both sides of the planar plate 10. The multi-cavity etalon structure, compared with a single-cavity etalon structure, can be increased in design flexibility by changing the reflecting films of each etalon. Desired dispersion characteristics can therefore be easily achieved.

Figure 17B:
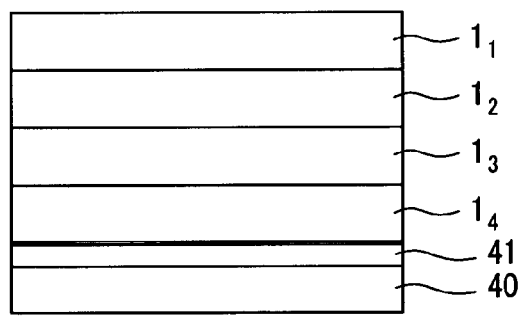
Figure 17C:
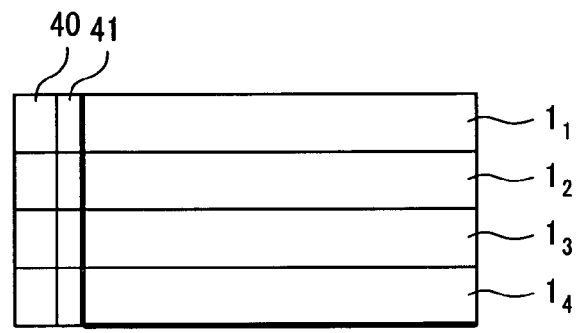

In terms of reduction in the number of components, a structure with both one set of heat transfer materials 41 and a temperature control element 40 laminated on the lower reflecting film of the lowest-layer etalon 14, as shown in FIG. 17B, is preferable for temperature control of the multi-cavity etalon. In terms of finer temperature control, however, a preferable structure is such that as shown in FIG. 17C, for an "n" number of multi-cavity etalon layers, an "n" number of sets of heat transfer materials 41 and temperature control elements 40 are laminated at ends of planar plates 10 of etalons $1_1$-$1_4$. In FIG. 17C, each temperature control element is in contact only with one end of each planar plate.

Further preferably, however, each temperature control element should be in contact so as to surround the entire planar plate.

Figure 18A:
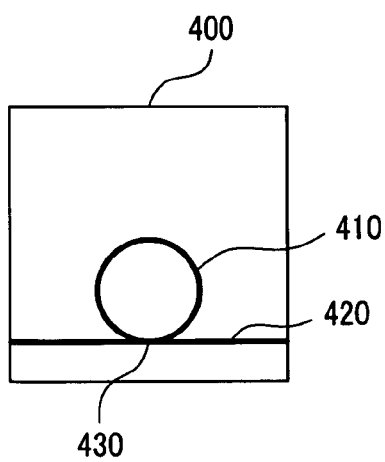
FIGS. 18A and 18B are diagrams showing examples of ring resonator configurations.
Figure 18B:
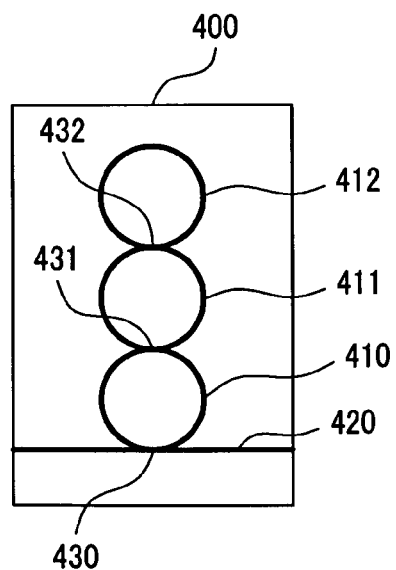

Alternatively, a ring cavity may be used instead of the multi-cavity etalon. An expression for representing delay characteristics of the ring cavity is the same as for the etalon, so the concept according to the present invention can be applied. A ring-cavity structure is shown in FIGS. 18A and 18B. The ring cavity shown in FIG. 18A includes an optical substrate 400, a ring-resonating element 410, an optical waveguide 420, and an optical coupler 430. The optical waveguide is higher than the substrate in terms of a refractive index of light, and the light is confined inside the waveguide and does not leak to the substrate. In the figure, incident light from the left of the waveguide travels to the right through the waveguide and reaches the optical coupler 430, at which the light is then divided into light that directly travels straight through the optical waveguide 420, and light that branches and partly travels towards the ring-resonating element 410. After the light has made its single round of the entire ring-resonating element 410, a portion of the light reaches the optical waveguide 420 and travels straight through the optical coupler 430, and all other portions encircle the ring-resonating element 310 once again. In this way, the latter plural portions of light, after encircling the entire ring-resonating element 410 several times, are coupled together and then go out into the waveguide 420. A resonator is thus realized. It is also possible to form the ring-resonating element 410 and the optical coupler 430 into a multi-stage configuration, as shown in FIG. 18B. More specifically, stacking ring-resonating elements 411 and 412 on the ring-resonating element 410 and coupling respective contact sections as optical couplers 431 and 432 increases design flexibility in comparison with that of a single-stage configuration, thus making the desired dispersion characteristics easily achievable.

Further alternatively, it is also be possible to use, in lieu of the multi-cavity etalon, the photonic crystal or photonic crystal fiber that has been actively researched in recent years in anticipation of application to dispersion-compensating elements. The photonic crystal is a structure in which substances of different refractive indices are regularly and periodically arrayed with sizes not exceeding any wavelength of light. Since this crystal has a period not permitting light of a specific wavelength region to pass through, the crystal can confine the light inside it and the application of this crystal to the elements that give desired dispersion characteristics is anticipated. The photonic crystal fiber is an optical fiber with a cladding of a construction in which a large number of air holes are regularly arrayed. This fiber, compared with a normal fiber, is also known to become able to provide great wavelength dispersion.

In order for the variable dispersion compensator 100 to have flat characteristics in an effective band as shown in FIGS. 8 to 11, gradients of the linear sections in characteristic curves of the plus-side variable dispersion-compensating unit 130 and minus-side variable dispersion-compensating unit 140 need to be opposite to one another in sign and the same in size. It is therefore necessary, after determining the configuration of the plus-side variable dispersion-compensating unit 130, to determine an amplitude reflectance of the etalon that is to form the minus-side variable dispersion-compensating unit 140, and the number of times the beam is to be reflected at the etalon.

Figure 19A:
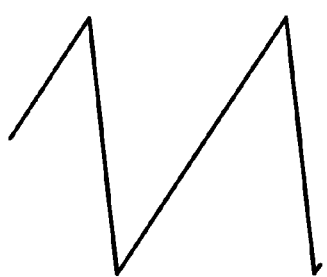
FIGS. 19A-19C are diagrams explaining a concept adopted to apply a basic nature of triangular waves in order to achieve ideal characteristics with a minus-side variable dispersion compensator in the embodiment of the present invention.
Figure 19B:
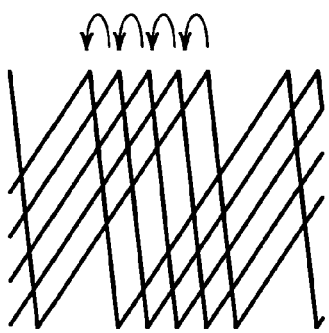
Figure 19C:
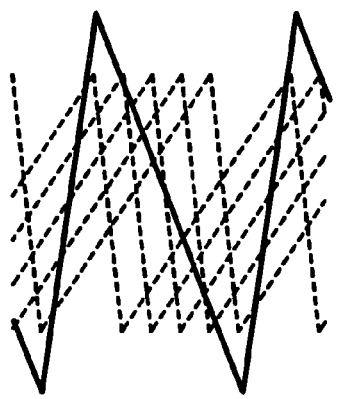

The minus-side variable dispersion-compensating unit 140 does not always need to provide such polygonal line characteristics as obtained in the plus-side variable dispersion-compensating unit 130. A method of achieving dispersion characteristics in that case is described below. FIGS. 19A to 19C are diagrams explaining a concept of applying the basic nature of triangular waves to realize ideal characteristics in the minus-side variable dispersion-compensating unit. FIG. 19A is a diagram showing a triangular wave whose band of a plus gradient is wide, and the characteristics obtained in this case are associated with those described referring to FIG. 12B. FIG. 19B shows a state in which a plurality of triangular waves are generated by progressively shifting a peak position of the triangular wave shown in FIG. 19A (i.e., by shifting the triangular wave in a wavelength axis). In FIG. 19C, the multiple triangular waves in FIG. 19B are each shown in the form of a broken line, and a waveform obtained by adding the triangular waves is denoted by a solid line. As can be easily seen by contrast between the waveform of FIG. 19A and the waveform denoted by a solid line in FIG. 19C, the band of the plus gradient is narrowed down and a band of a minus gradient is extended. In this case, the optimum amount of shifting for maximizing the band of the minus gradient is uniquely determined from the number of adding operations and the band of the plus gradient.

The peak position can be more easily shifted using the same method as that of shifting by lowering the temperature of the etalon in the post-compensating section of the plus-side variable dispersion-compensating unit 130. That is to say, it is possible to provide in large numbers the configuration described referring to FIG. 13, and control the temperature of each etalon. In this case, however, loss increases and the number of components required also increases.

Figure 20A:
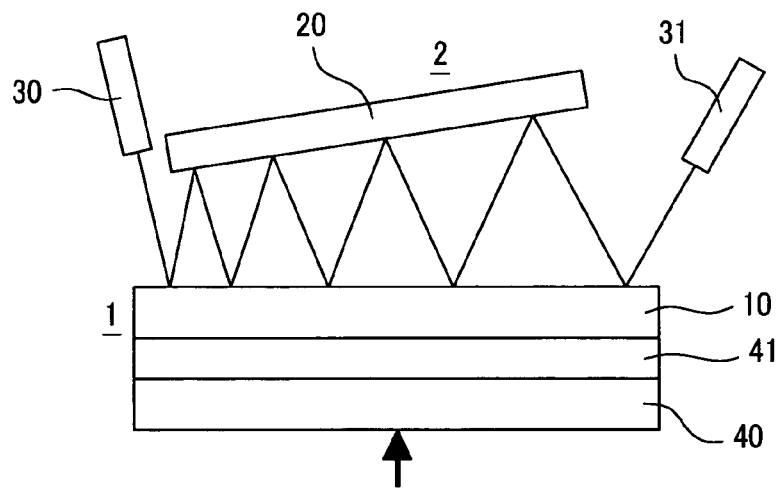
FIG. 20A is a diagram showing a configuration in which the concept described per
Figure 20B:
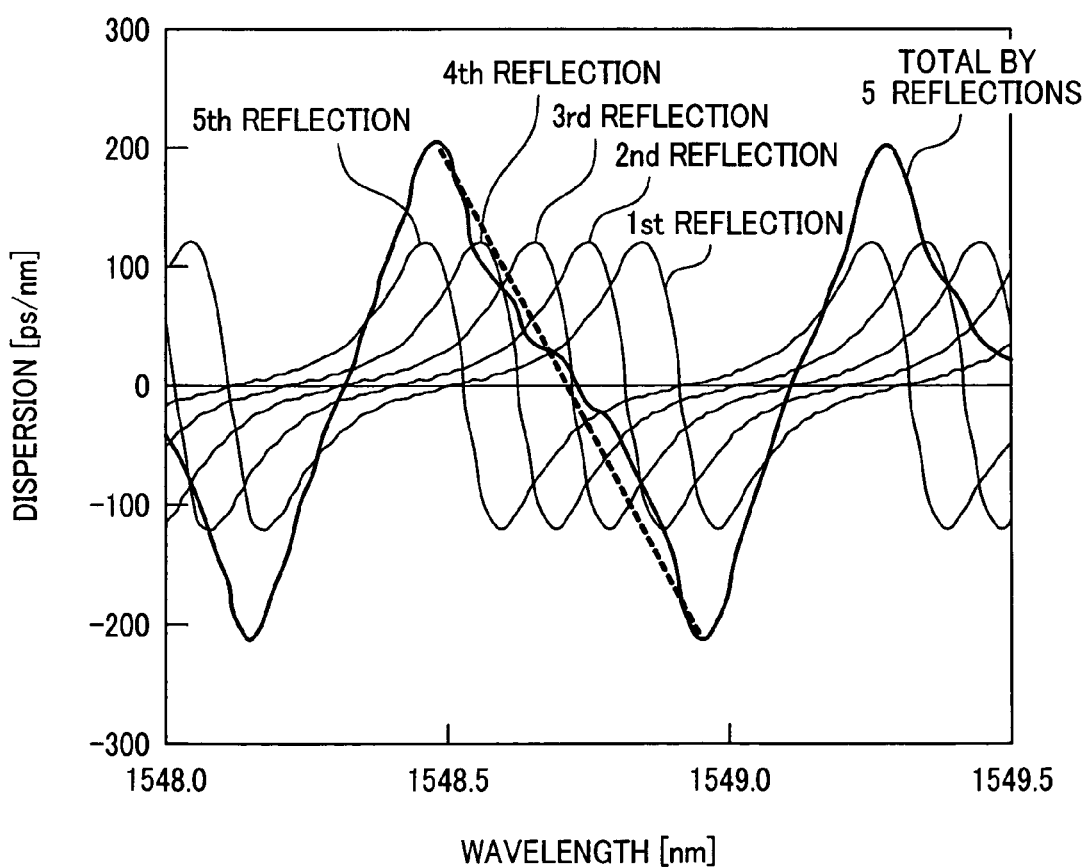
FIG. 20B is a diagram showing the dispersion characteristics obtained.

Another method of shifting the peak position is by giving a slight angle to the mirror 2 and the etalon 1 in the etalon oblique reflection scheme of the present invention and adding all dispersion characteristics while gradually shifting the peak position with each reflection. Thus, the band can be spread. A configuration for implementing the concept shown in FIGS. 19A to 19C is shown in FIG. 20A, and the dispersion characteristics obtained are shown in FIG. 20B. FIGS. 20A, 20B assume an etalon 1 having an amplitude reflectance "r" of 40%. As shown in FIG. 20B, assigning a required angle to a mirror 2 and etalon 1 makes it possible to shift a peak position of dispersion characteristics independently for each number of reflections from one to five. It is possible, by adding these dispersion characteristics, to obtain such characteristics as shown in the form of a broken line in FIG. 20B, that is, characteristics close to those of the minus-side variable dispersion-compensating unit 140 that have the minus gradient shown in FIG. 8. Preferably, the amount of shifting, based on closer studies of the triangular wave obtained, is determined from the number of adding operations and the band of the plus gradient beforehand and then the mirror angle and amplitude reflectance values that are likely to be usable in the etalon oblique reflection scheme are selected. Thus, the optimum amount of shifting can be calculated efficiently.

Compared with the ideal characteristics denoted as a broken line in FIG. 20B, other dispersion characteristics shown in FIG. 20B are distorted because, as shown in FIG. 12C, the original characteristics of the etalon have distortion different from that of the triangular wave. Two methods are available to achieve a greater amount of dispersion in the etalon oblique reflection scheme of FIG. 20A. One is by enhancing the amplitude reflectance "r" of the etalon, and one is by adopting a multi-stage etalon oblique reflection scheme. The former is preferable in terms of loss. However, enhancing the amplitude reflectance "r" of the etalon will correspondingly augment distortion components in comparison with those of the triangular wave. Therefore, distortion will also occur in the method of using the nature of the triangular wave, described referring to FIGS. 19A to 19C.

Figure 21:
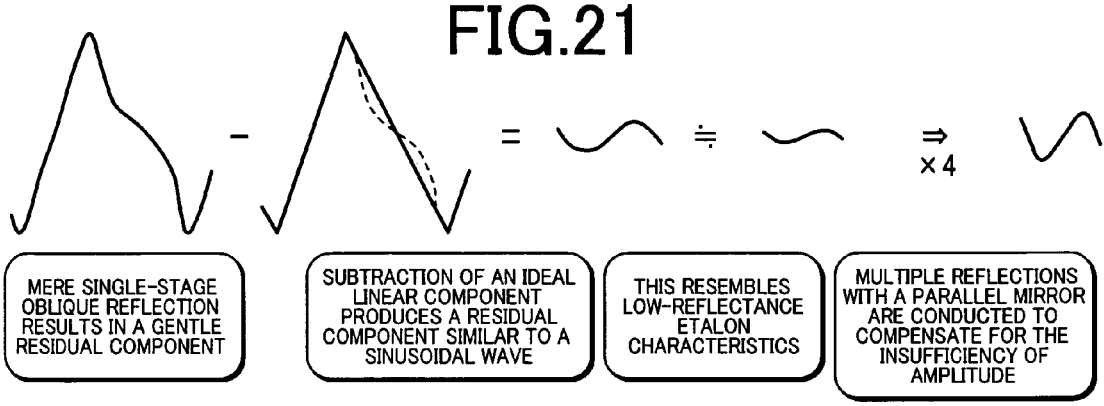
FIG. 21 is a diagram schematically explaining a method for representing the ideal characteristics of the minus-side variable dispersion-compensating unit more faithfully.

A method for representing the ideal characteristics of the minus-side variable dispersion-compensating unit 140 more faithfully than in the configuration of FIG. 20A is described below. FIG. 21 schematically explains the method. The first subtraction results in FIG. 21 indicate that a differential component between the resulting waveform showing the total characteristics of five reflections in FIG. 20B, and the triangular waveform having the ideal characteristics denoted as a broken line in FIG. 20B, is approximate to a sine wave (the above differential component will be hereinafter called the higher-order dispersion ripple). As is expressed using "≈" the higher-order dispersion ripple close to a sine wave is considered to have a shape close to that obtained when the etalon shown in FIG. 12A has a low amplitude reflectance (e.g., r=5%). As is expressed using "⇒", therefore, the etalon with the small low amplitude reflectance is used to reflect a beam multiple times with a parallel arrangement of the etalon and the mirror and conduct corrections with amplitude increased by a factor of four.

Figure 22A:
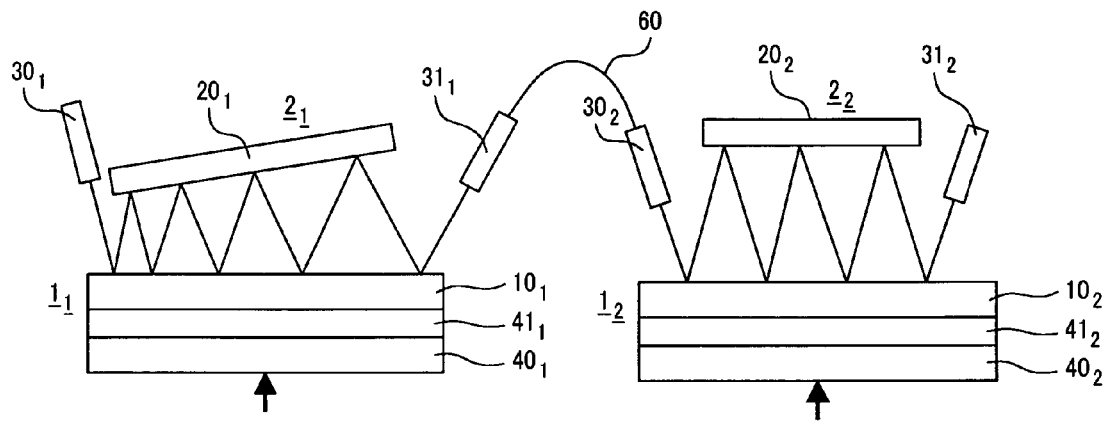
FIG. 22A is a diagram showing a configuration intended to realize the concept described per FIG. 21.
Figure 22B:
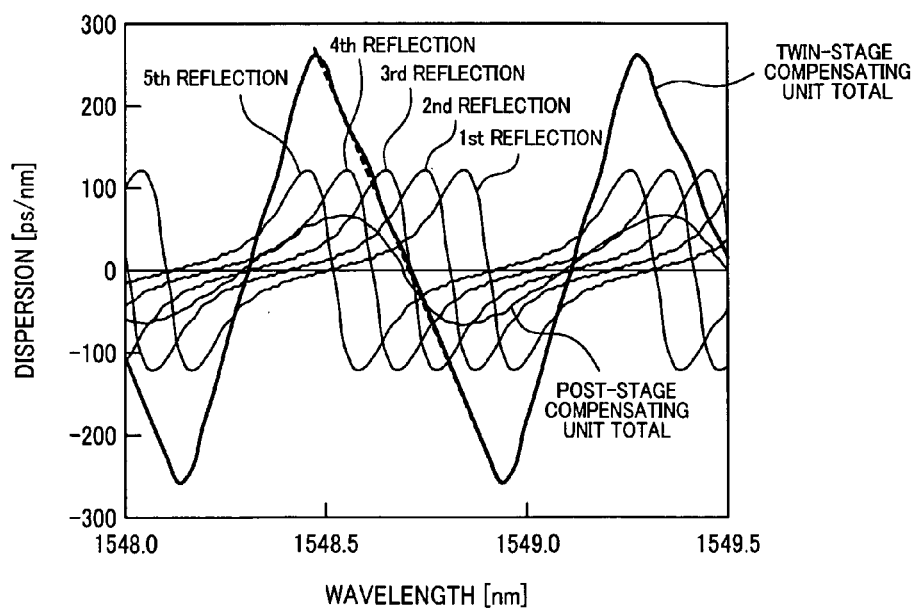
FIG. 22B is a diagram showing dispersion characteristics obtained.

A configuration for realizing the concept described above referring to FIG. 21 is shown in FIG. 22A, and the dispersion characteristics obtained are shown in FIG. 22B. These figures assume that the angle formed by an etalon $1_1$ and a mirror $2_1$ in a dispersion pre-compensating section of the etalon oblique reflection scheme, the dispersion pre-compensating section being shown with underscored characters in the left of FIG. 22A is 0.051°. The figures also assume that the etalon in the dispersion pre-compensating section has an amplitude reflectance "r" of 40% and reflects a beam five times. Output light from a collimator $31_1$ of the dispersion pre-compensating section is input to a collimator $30_2$ of a dispersion post-compensating section via a fiber 60. In addition, both figures assume that an etalon $1_2$ and a mirror $2_2$ in the dispersion post-compensating section are parallel to each other and that the etalon has an amplitude reflectance "r" of 10% and reflects the beam four times. The dispersion characteristics by one reflection to five reflections, shown in FIG. 22B, are obtained in the dispersion pre-compensating section, and the dispersion post-compensating section total shown in FIG. 22B is obtained in the dispersion post-compensating section. The twin-stage compensating section total shown in FIG. 22B is obtained by totaling the dispersion characteristics obtained in the dispersion pre-compensating section and the dispersion post-compensating section. The dispersion compensating characteristics curve shown as the twin-stage compensating section total in FIG. 22B essentially overlaps the broken line that denotes ideal characteristics. This indicates that linearity is significantly improved in comparison with the relevant characteristics in FIG. 20B. In the present embodiment, the mirror angle is preferably 1° or less. If this angle is exceeded, the amounts of shifting with respect to wavelengths associated with peaks of the reflections at each etalon will also increase too significantly for desired characteristics to be obtained.

Although this is not described in detail, the dispersion characteristics curves of the plus-side variable dispersion-compensating unit 130 and minus-side variable dispersion-compensating unit 140, described referring to FIGS. 14 and 22, can be shifted in the wavelength axis (or frequency axis), as shown in FIG. 9. That is, this can be accomplished by controlling the etalon temperatures of the respective dispersion pre-compensating section and post-compensating section to prevent the two curves from shifting with respect to each other.

Order of entrance and exit of light may be reversed for the dispersion compensator in the present invention. More specifically, while in the configuration of FIG. 22A, light is passed through collimator $30_1$, etalon $1_1$, collimator $31_1$, collimator $30_2$, etalon $1_2$, and collimator $31_2$, in that order, as in the configuration of FIG. 14A, the same results can also be obtained by reversing the order, that is, passing the light through collimator $31_2$, etalon $1_2$, collimator $30_2$, collimator $31_1$, etalon $1_1$, and collimator $30_1$, in that order.

Figure 23:
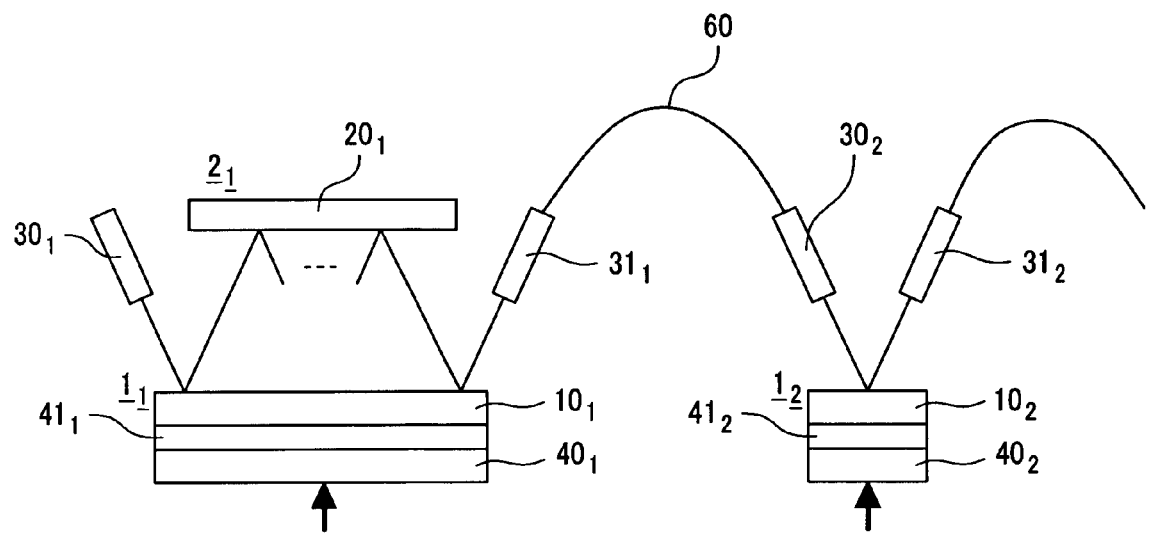
FIG. 23 is a diagram showing a structure not including the mirror of the post-compensating section shown in FIG. 22A.

For correction with an etalon of a low amplitude reflectance, the etalon may be adapted so as to reflect the light one time only. A configuration for achieving this is shown in FIG. 23. In this case, no mirrors are necessary since the etalon reflects the light just one time. In addition, while this configuration, as with the configuration shown in FIG. 22A, assumes that light is passed through collimator $30_1$, etalon $1_1$, collimator $31_1$, collimator $30_2$, etalon $1_2$, and collimator $31_2$, in that order, the same results can also be obtained by reversing the order, that is, passing the light through collimator $31_2$, etalon $1_2$, collimator $30_2$, collimator $31_1$, etalon $1_1$, and collimator $30_1$, in that order.

Figure 24:
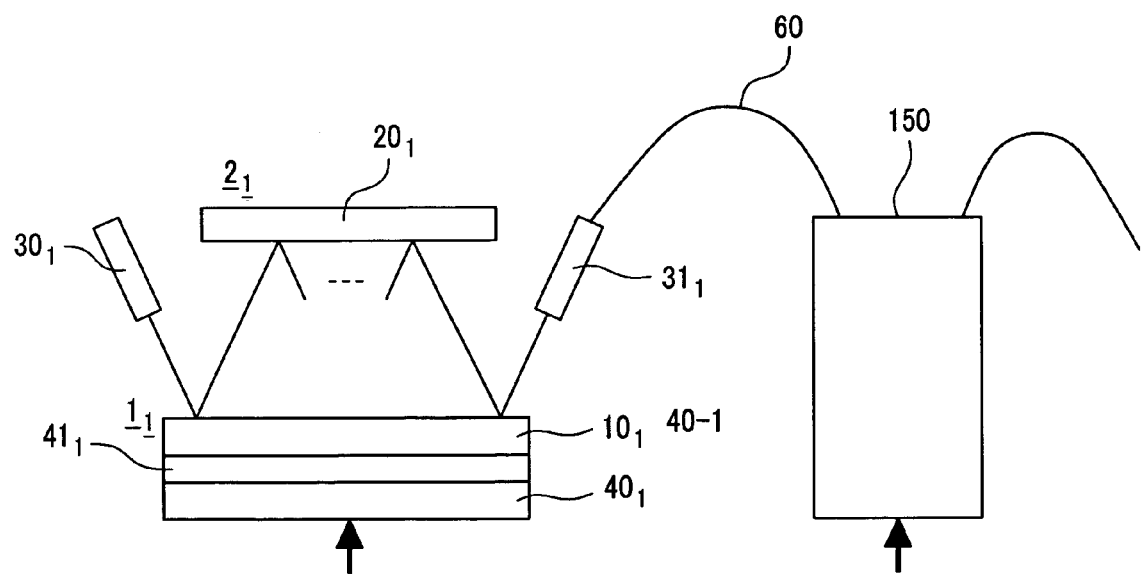
FIG. 24 is a diagram explaining that the post-compensating section of FIG. 23A can take various configurations.

Furthermore, if this concept is further developed, dispersion compensation for conducting corrections for a higher-order dispersion ripple may use an element other than an etalon. An associated configuration is shown in FIG. 24. In this figure, a variable dispersion-compensating unit 150 conducts corrections for the higher-order dispersion ripple. The variable dispersion-compensating section 150 can be an element that achieves a relatively small amount of dispersion. For example, a conventional optical-fiber grating, a multi-cavity etalon, or a ring cavity can be used as the element.

Although it has been described that the dispersion characteristics of the plus-side variable dispersion-compensating unit 130 are shifted to the minus side or the plus side, the dispersion characteristics of the minus-side variable dispersion-compensating unit 140 can likewise be shifted to the minus or plus side by connecting the etalon oblique reflection scheme in multi-stage form.

Figure 25:
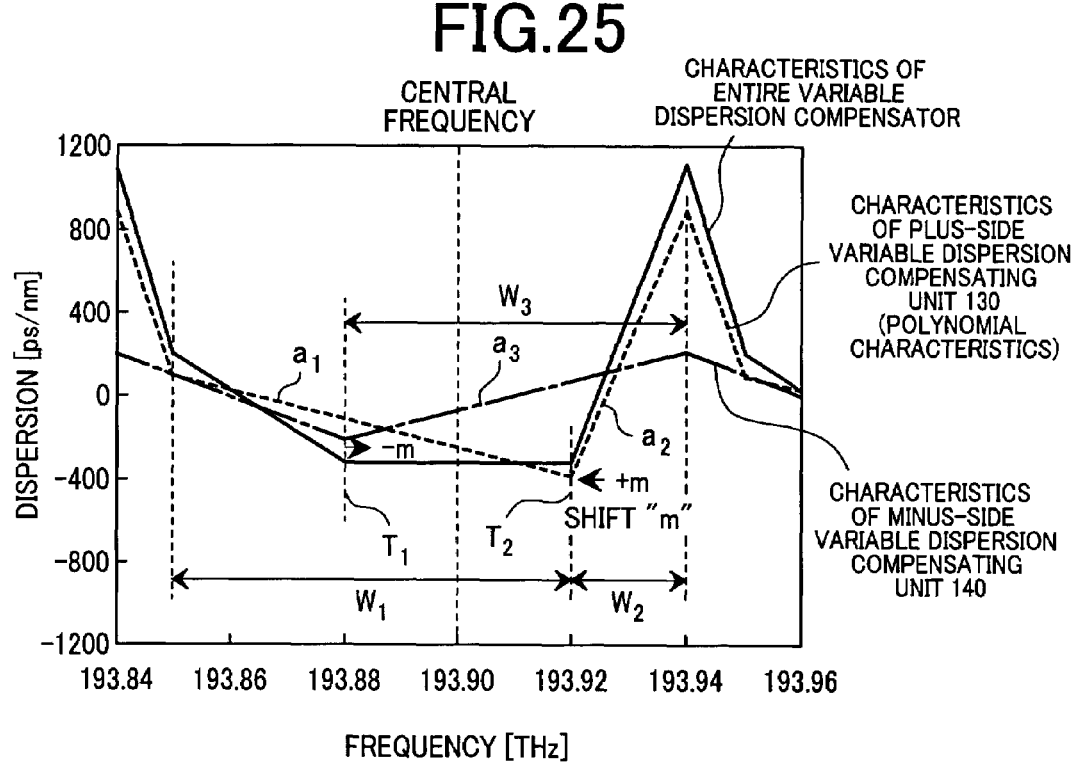
FIG. 25 is a diagram explaining a method of controlling a plus-side variable dispersion-compensating unit 130 and a minus-side variable dispersion-compensating unit 140 in the present invention.

Next, a method of controlling the plus-side variable dispersion-compensating unit 130 and the minus-side variable dispersion-compensating unit 140 according to the present invention is described below. FIG. 25 shows an ideal linear model to describe the control method. The band of a plus gradient of a characteristics curve of the plus-side variable dispersion-compensating unit 130 is taken as $W_1$, the gradient in that band, as "$a_1$", a band adjacent to the band, as $W_2$, and a gradient in the band $W_2$, as "$a_2$". Also, the band of a minus gradient of a characteristics curve of the minus-side variable dispersion-compensating unit 140 is taken as $W_3$, and the gradient in that band, as "$a_3$". In this figure, since frequency is plotted on a horizontal axis and since frequency and wavelength are in a relationship of inverse proportion as described previously, "$a_1$", "$a_2$", and "$a_3$" take signs opposite to those used when definitions are conducted using wavelength. An example of $W_1 > W_2$ and $W_1 > W_3$ is also shown in this figure. In order for the variable dispersion compensator to reduce the higher-order dispersion (shown in expression (6)) to zero, gradients "$a_1$" and "$a_3$" must be opposite to each other in sign and the same in absolute value.

$$D_2 = \frac{dD}{d\lambda} \quad (6)$$

Ideally, it is preferable that both gradients be the same in absolute value. In consideration of factors such as manufacturing-associated problems and differences in system specifications, however, it may be permitted for a differential relative quantity of $|(a_1-a_3)/a_1|$ to take values of about 0.1 or less. Also, as shown in FIG. 25, a smaller frequency in an effective band of the variable dispersion compensator is taken as $T_1$, and a larger frequency in the effective band is taken as $T_2$. Additionally, as described in FIGS. 7A-7C to 11, the appropriate amount of shifting is given to the plus-side variable dispersion-compensating unit 130 and the minus-side variable dispersion-compensating unit 140 so as to vary the respective wavelength (or frequency) characteristics. As shown in FIG. 25, a minus sign, a plus sign, and directions of the signs are defined for the amount of shifting, "m".

Figure 26:
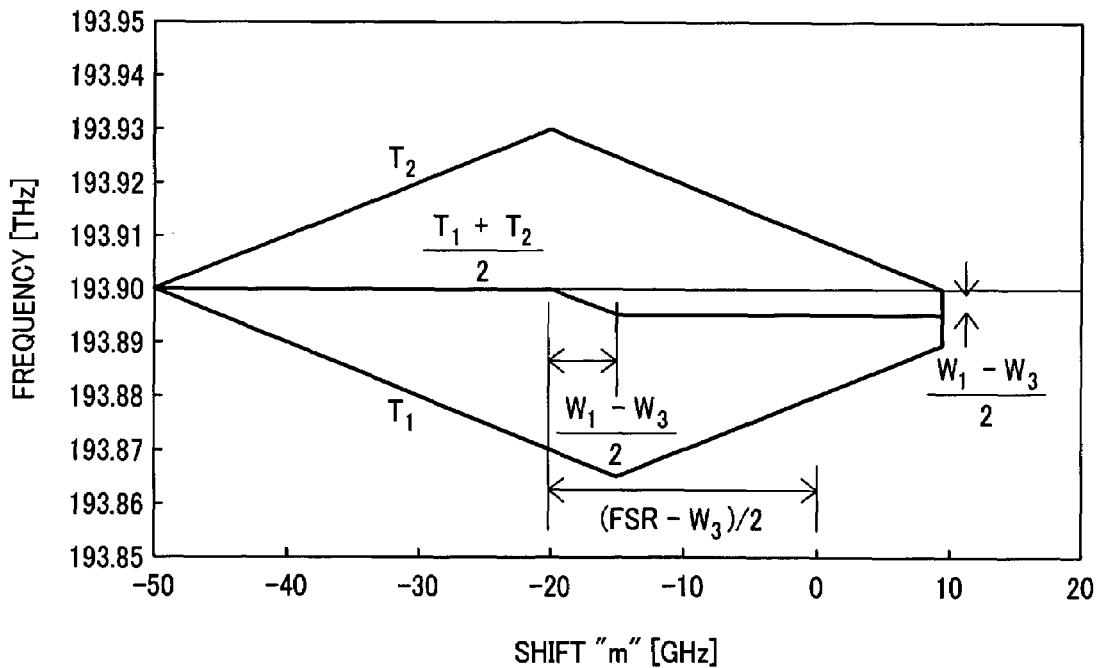
FIG. 26 is a diagram that shows the changes in $T_1$ and $T_2$ that occur when the amount of shifting is changed in the example of FIG. 25, and changes in the average value $T_c$ (central frequency) obtained at that time, wherein $T_1$ and $T_2$ are a smaller frequency and a larger frequency, respectively, in an effective band of the variable dispersion compensator.

For WDM optical transmission systems, each wavelength is defined by the grids specified in the International Telecommunication Union (ITU). A central wavelength of the variable dispersion compensator, therefore, must not change during control. In other words, the occurrence of a change in the central wavelength means that the effective band is correspondingly narrowed. A control method for giving "m" so as not to change the central wavelength (or frequency) is easy for $W_1 = W_3$. That is, the amounts of shifting are given to the plus-side variable dispersion-compensating unit 130 and the minus-side variable dispersion-compensating unit 140 so that both amounts of shifting take the same absolute value and have opposite signs. At this time, suppose that the plus-side variable dispersion-compensating unit and the minus-side variable dispersion-compensating unit are assigned the amounts of shifting, "+m" and "−m", respectively (in FIG. 25, directions in which two peaks are brought close). In this case, although the total value shown in FIG. 25 applies to "m=0", since an overlapping portion becomes small, the characteristics of the entire dispersion compensator are narrowed in band and increased in the amount of dispersion, as described in FIG. 7C. Conversely, if the plus-side variable dispersion-compensating unit 130 and the minus-side variable dispersion-compensating unit 140 are assigned the amounts of shifting, "−m" and "+m", respectively, since an overlapping portion becomes large, the characteristics of the entire dispersion compensator are extended in band and reduced in the amount of dispersion, as described in FIG. 7B. In the example of FIG. 25, however, since $W_1 > W_3$, it is not good enough just to assign opposite signs when giving the plus-side variable dispersion-compensating unit 130 and the minus-side variable dispersion-compensating unit 140 the amounts of shifting. The following describes a method of giving the amounts of shifting:

For $W_1 > W_3$, changes in $T_1$ and $T_2$, associated with changing the amount of shifting, "m", and changes in the average value $T_c$ (central frequency) obtained appear as shown in FIG. 26. At this time, the amounts of shifting are given to the plus-side variable dispersion-compensating unit 130 and the minus-side variable dispersion-compensating unit 140 so that both amounts of shifting take the same absolute value and have opposite signs. In FIG. 26, FSR=100 [GHz], $W_1$=70 [GHz], $W_2$=10 [GHz], and $W_3$=60 [GHz] are assigned as parameters. For "m"=−50 [GHz], both $T_1$ and $T_2$ are 193.90 THz and the effective band of the variable dispersion compensator is 0 GHz. Gradually increasing "m" causes $T_1$ and $T_2$ to decrease below or increase above 193.90 THz, and the respective changes are equal in absolute quantity. Accordingly, the central frequency is 193.90 THz, which is constant. However, since $W_1 > W_3$, if "m" exceeds $(W_3-FSR)/2$, $T_2$ starts decreasing and the central frequency also varies. This tendency continues until "m" has increased to $(W_3-FSR)/2+(W_1-W_3)/2 = (W_1-FSR)/2$. Subsequently, as "m" increases, $T_1$ also starts increasing and the variation $\Delta T_c$ of the central frequency becomes constant at $(W_1-W_3)/2$. The relationship between "m" in FIG. 22 and the variation $\Delta T_c$ of the central frequency therein can be represented by expression (7).

$$\Delta T_c = \begin{cases} 0 & \left(m \leq \frac{W_3 - FSR}{2}\right) \\ -\left(m + \frac{FSR - W_3}{2}\right) & \left(\frac{W_3 - FSR}{2} < m \leq \frac{W_1 - FSR}{2}\right) \\ -\frac{W_1 - W_3}{2} & \left(\frac{W_1 - FSR}{2} < m\right) \end{cases} \quad (7)$$

Suppose that in order to suppress the changes in the central frequency that occur when $W_1$ is not equal to $W_3$, the amounts of shifting are given to the plus-side variable dispersion-compensating unit 130 and the minus-side variable dispersion-compensating unit 140 as follows by use of parameter "$m_{offset}$":

The amount of shifting that is to be given to the plus-side variable dispersion-compensating unit is changed from "+m" to "$m_{offset}$+m", and the amount of shifting that is to be given to the minus-side variable dispersion-compensating unit is changed from "−m" to "$m_{offset}$−m", where the "$m_{offset}$" value for not changing the central frequency can be given as below by using expression (8) instead of expression (7):

$$m_{offset} = \begin{cases} 0 & \left(m \leq \frac{W_3 - FSR}{2}\right) \\ \left(m + \frac{FSR - W_3}{2}\right) & \left(\frac{W_3 - FSR}{2} < m \leq \frac{W_1 - FSR}{2}\right) \\ \frac{W_1 - W_3}{2} & \left(\frac{W_1 - FSR}{2} < m\right) \end{cases} \quad (8)$$

Figure 27:
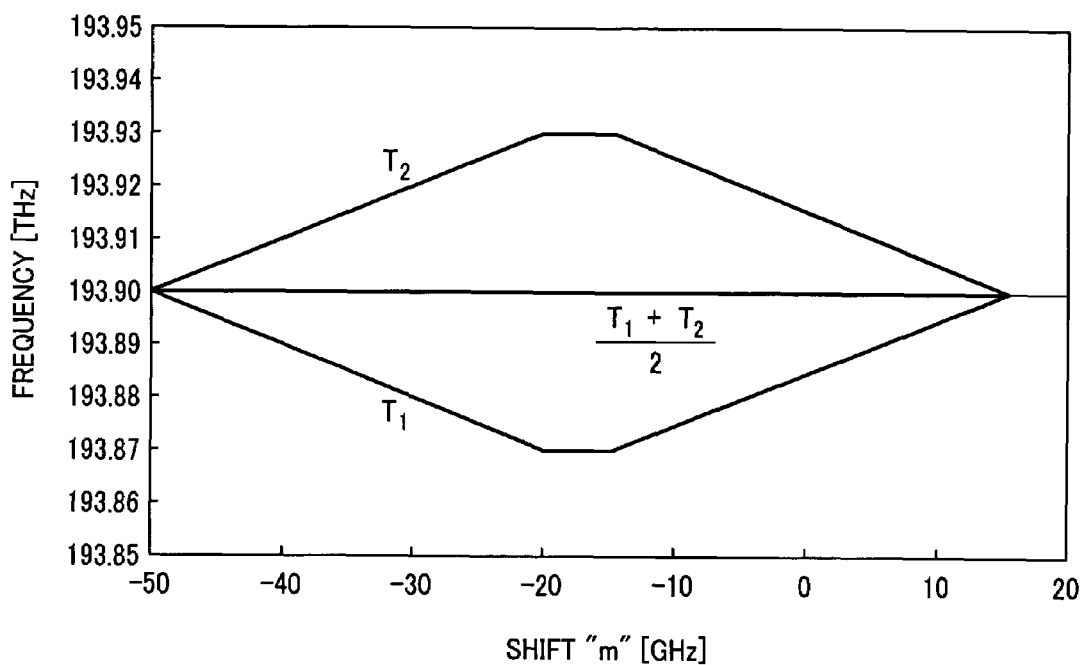
FIG. 27 is a diagram showing the changes in $T_1$, $T_2$, and $T_c$ that occur when an appropriate offset is set for the amount of shifting in order to suppress the changes in central frequency in the example of FIG. 25.

The changes in $T_1$ and $T_2$ that occur when this control method is implemented, and changes in the average value $T_c$ (central frequency) obtained are shown in FIG. 27. It can be seen from this figure that $T_c$ is controlled to a constant value.

Figure 28:
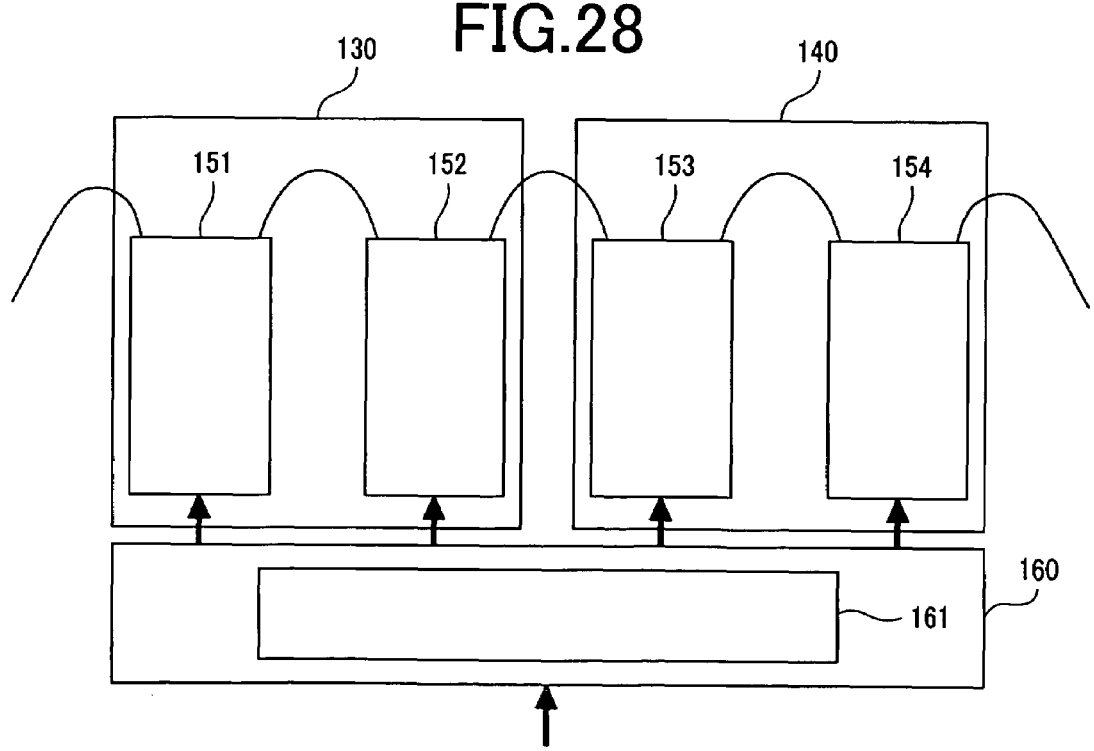
FIG. 28 is a diagram showing a first configuration of the variable dispersion compensator having a conversion table based on evaluation results concerning the relationships between the amounts of dispersion and optimal temperatures of each compensating section.

The above is the basic concept of the control scheme employed for the plus-side variable dispersion-compensating unit 130 and the minus-side variable dispersion-compensating unit 140 in the present invention to control a variable amount of dispersion with a central frequency remaining fixed. Ideal control of actual etalon temperatures, however, may not be possible for manufacturing-associated reasons such as the possible differences in workmanship between individual etalons. In such a case, a conversion table is provided beforehand that is based on evaluation results on the relationships between the amount of dispersion and optimal temperatures of compensating sections. After that, a converting unit 160 having a conversion table 161 under the configuration shown in FIG. 28 controls various compensating sections, namely, 151, 152, 153, and 154, of the plus-side variable dispersion-compensating unit 130 and the minus-side variable dispersion-compensating unit 140, at a temperature appropriate for the amount of dispersion that has been set by a user. In this example, both the plus-side variable dispersion-compensating unit 130 and the minus-side variable dispersion-compensating unit 140 include two such pre-compensating sections and post-compensating sections as shown in FIG. 14A. The number of pre-compensating sections and post-compensating sections, however, can be more than two each.

Figure 33:
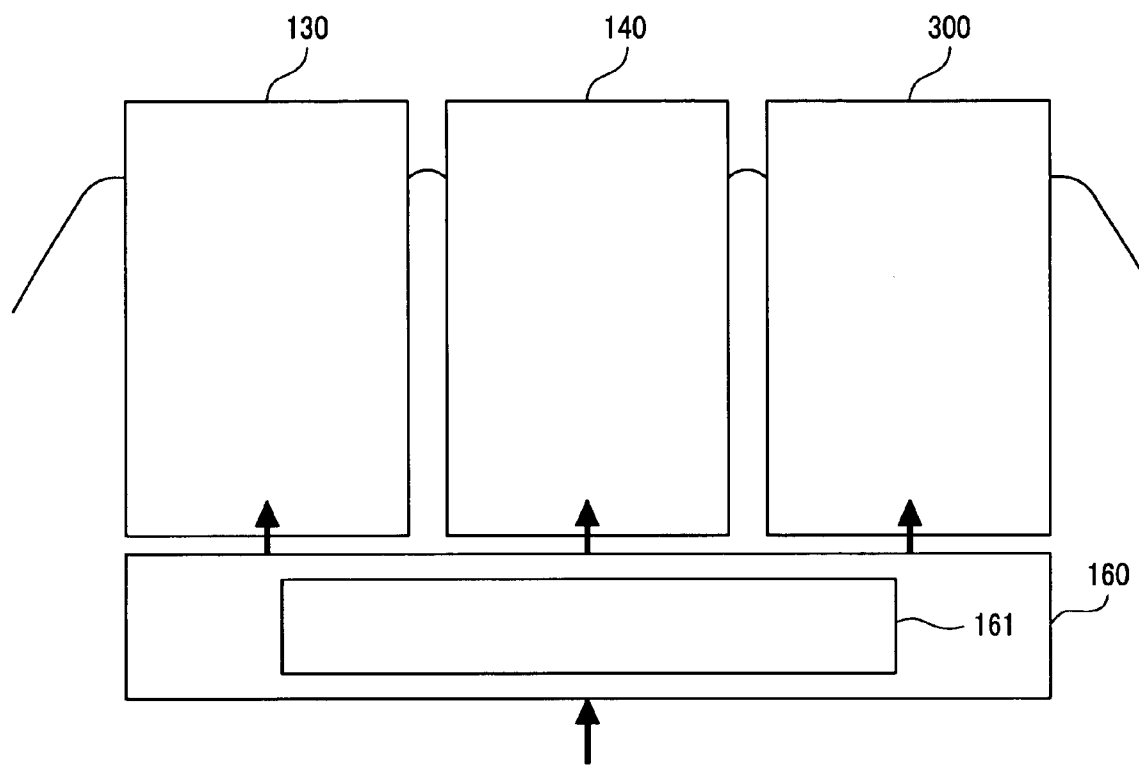
FIG. 33 is a diagram showing a second configuration of the variable dispersion compensator having a conversion table based on evaluation results concerning the relationships between the amounts of dispersion and optimal temperatures of each compensating section.
Figure 34:
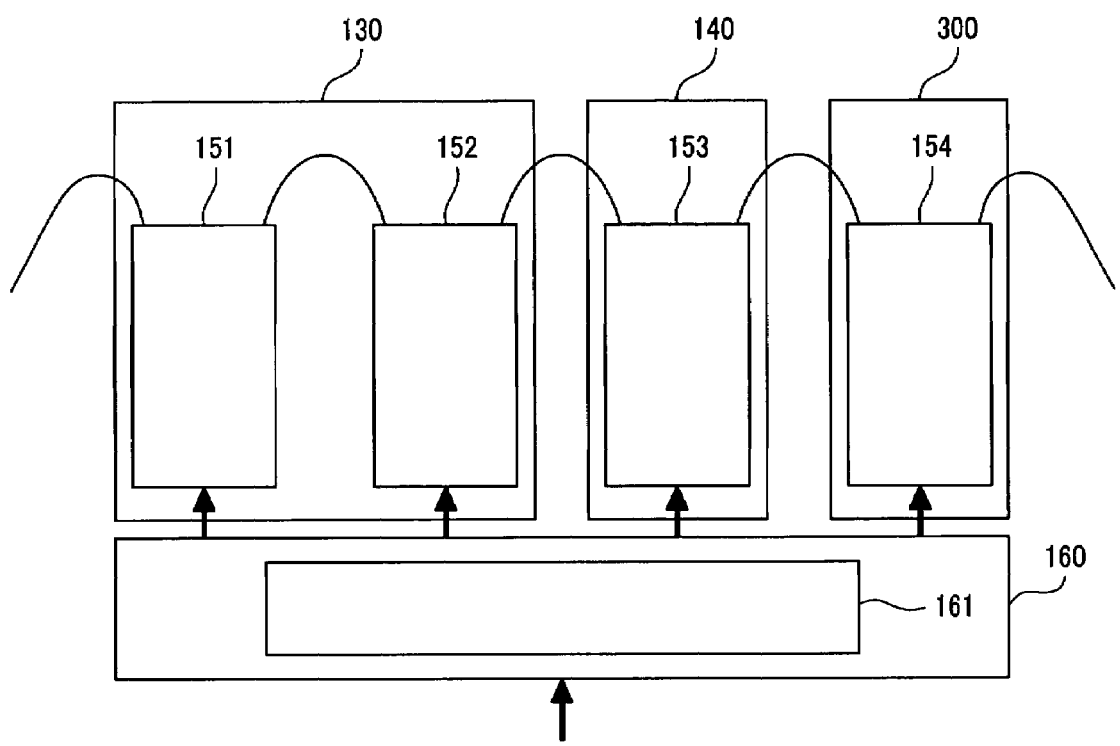
FIG. 34 is a diagram showing a third configuration of the variable dispersion compensator having a conversion table based on evaluation results concerning the relationships between the amounts of dispersion and optimal temperatures of each compensating section.

Additionally speaking, the respective dispersion characteristics of the plus-side variable dispersion-compensating unit 130 and the minus-side variable dispersion-compensating unit 140 may not be ideal characteristics for manufacturing-associated reasons such as the possible differences in workmanship between individual etalons. In such a case, a variable dispersion-compensating unit 300 for correction is provided to conduct corrections for the characteristics of both the plus-side and minus-side variable dispersion-compensating units, as shown in FIG. 33. In this configuration with the three compensating units, each compensating unit is independently temperature-controlled by a converting unit 160 having a conversion table 161 which shows the relationships between the amount of dispersion and optimal temperatures of each compensating section. More specifically, the post-compensating section of the minus-side dispersion-compensating unit 140 in FIG. 22A can be used as the variable dispersion-compensating unit 300 for correction. In this case, the pre-compensating section of the minus-side dispersion-compensating unit 140 in FIG. 22A is used as the minus-side variable dispersion-compensating unit 140 shown in FIG. 33, and is controlled independently of the variable dispersion-compensating unit 300 for correction. FIG. 34 shows a further configuration. That is, a plus-side variable dispersion-compensating unit 130 includes a twin-stage arrangement with two variable dispersion-compensating sections 151 and 152, and a minus-side variable dispersion-compensating unit 140 and a variable dispersion-compensating unit 300 for correction each include a single-stage arrangement with one variable dispersion-compensating section 153 or 154. Etalons in the variable dispersion-compensating sections 151 and 152 can be either the same or different from each other in one-side amplitude reflectance. Also, when the variable dispersion-compensating sections 151 and 152 are to be constructed with etalons and mirrors opposed to one another, both the sections 151 and 152 can also be adapted to reflect a beam the same number of times at each etalon. It is possible to design so that these values match a gradient of minus-side dispersion characteristics of the minus-side variable dispersion-compensating unit 140. In other words, if ideal dispersion characteristics cannot be obtained for manufacturing-associated reasons, the variable dispersion-compensating sections 151-154 shown in FIG. 34 may be constructed into a four-stage arrangement with three or four kinds of etalons of different amplitude reflectances. A converting unit 160 with a conversion table 161 can then be used to conduct independent temperature control of three or four systems. In a more simplified configuration, the variable dispersion-compensating sections 151-154 may be constructed into a four-stage arrangement with three kinds of etalons of different amplitude reflectances (151 and 152, however, are of the same reflectance). Thus, a plus-side variable dispersion-compensating unit 130, a minus-side variable dispersion-compensating unit 140, and a variable dispersion-compensating unit 300 for correction can be used for independent temperature control of three systems. If the configuration is simplified to this extent, however, since the dispersion characteristics of the plus-side variable dispersion-compensating unit 130 may not always become polygonal, the variable amount of dispersion will not be large or plus/minus asymmetrical. It will be possible, however, to manufacture less expensive variable dispersion compensators by reducing the number of components required and/or simplifying the temperature control sections.

A further control method is described below. As described in FIGS. 14 and 30, the total dispersion characteristics can be shifted to the plus and minus sides by constructing the etalon oblique reflection scheme into twin-stage form and offsetting the peak wavelength of dispersion characteristics to the shorter- or longer-wave side. Such shifting, however, can also be conducted continuously. A control method for achieving this is described using FIGS. 31A and 31B. FIG. 31A shows the individual and total dispersion characteristics of the pre-compensating section and post-compensating section in the twin-stage configuration described in FIG. 14A. A top row of FIG. 31A shows a state in which the peak position of the dispersion characteristics of the post-compensating section is shifted to the longer-wave side by temperature-controlling each compensating section at the peak position of the dispersion characteristics of the pre-compensating section. Consequently, as previously described, the dispersion characteristics of the plus-side variable dispersion-compensating unit 130 that have been shifted to the plus side can be achieved as the total characteristics denoted by a broken line in the figure. A middle row of FIG. 31A shows a state in which the peak position of the dispersion characteristics of the post-compensating section is shifted for essentially the same wavelength by temperature-controlling each compensating section at the peak position of the dispersion characteristics of the pre-compensating section. As a result, the symmetrical dispersion characteristics of the plus-side variable dispersion-compensating unit 130 that have not been shifted to either the plus or minus side can be achieved as the total characteristics denoted by a broken line in the figure. A bottom row of FIG. 31A shows a state in which the peak position of the dispersion characteristics of the post-compensating section is shifted to the shorter-wave side by temperature-controlling each compensating section at the peak position of the dispersion characteristics of the pre-compensating section. Consequently, as previously described, the dispersion characteristics of the plus-side variable dispersion-compensating unit 130 that have been shifted to the minus side can be achieved as the total characteristics denoted by a broken line in the figure. The characteristics of the entire variable dispersion compensator, shown in FIG. 31B, are obtained when the above three sets of total characteristics are each further combined with the dispersion characteristics of the minus-side variable dispersion-compensating unit 140 that are described previously. That is to say, the dispersion characteristics (in the top row of FIG. 31A) of the plus-side variable dispersion-compensating unit 130 that have been shifted to the plus side are used to obtain a plus variable amount of dispersion, as shown in a top row of FIG. 31B, with the entire variable dispersion compensator. Next, the symmetrical dispersion characteristics (in the middle row of FIG. 31A) of the plus-side variable dispersion-compensating unit 130 that have not been shifted to either the plus or minus side are used to obtain a near-zero variable amount of dispersion, as shown in a middle row of FIG. 31B, with the entire variable dispersion compensator. Finally, the dispersion characteristics (in the bottom row of FIG. 31A) of the plus-side variable dispersion-compensating unit 130 that have been shifted to the minus side are used to obtain a minus variable amount of dispersion, as shown in a bottom row of FIG. 31B, with the entire variable dispersion compensator. Such control can be implemented in the configuration of FIG. 28. More specifically, this is possible by providing necessary temperature information of each compensating section in a conversion table 161 and realizing the plus-side or minus-side shifted dispersion characteristics of the plus-side variable dispersion-compensating unit in a continuous or step-by-step fashion.

Figure 32:
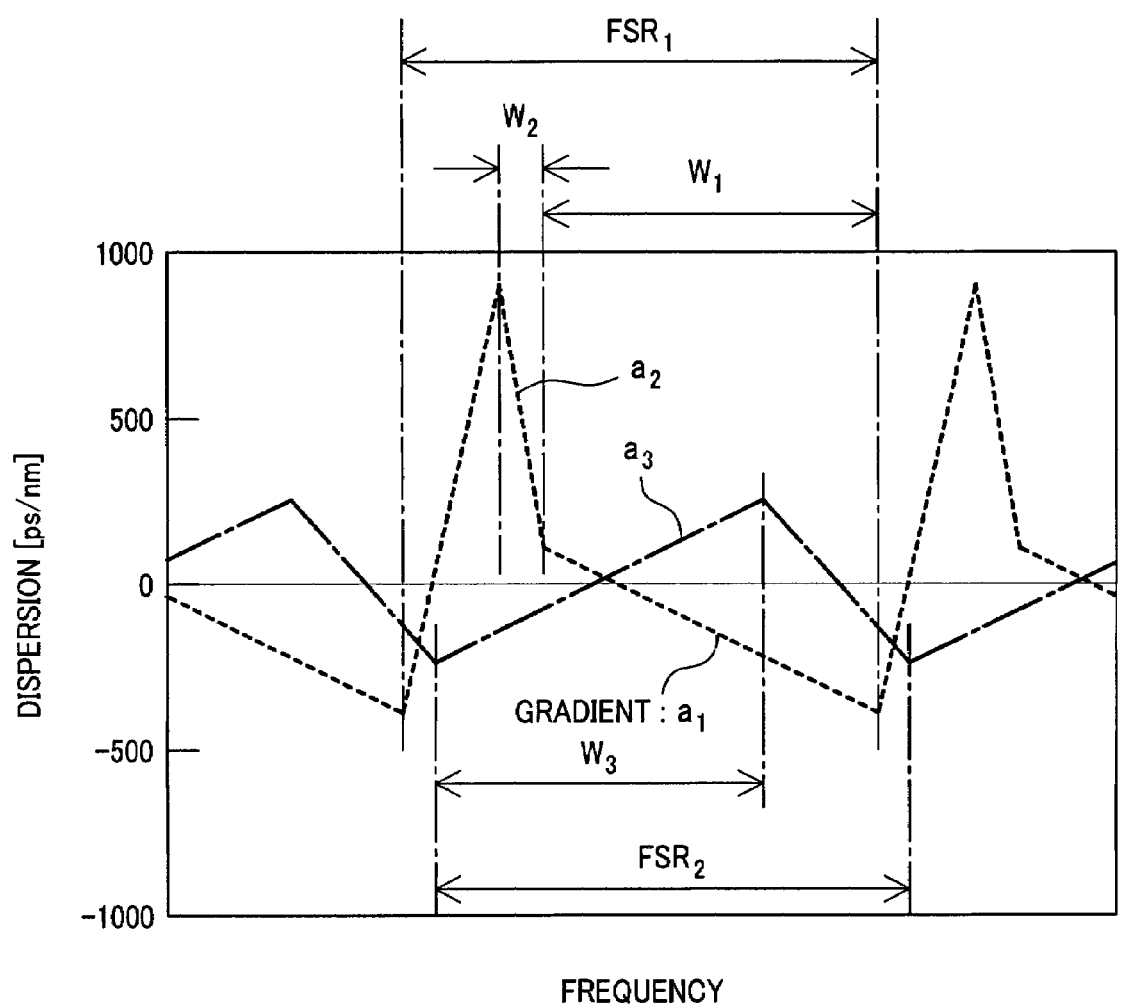
FIG. 32 is a diagram showing the relationship between the polygonal line characteristics of the variable dispersion compensator, a gradient, and a band.

The basic characteristics of the variable dispersion compensator of the present invention are shown in FIG. 32. Wavelength dispersion characteristics of a first variable dispersion-compensating unit having a variable dispersion control function to shift the wavelength dispersion characteristics in a frequency axis include a frequency period $FSR_1$, a frequency band $W_1$ almost approximated with a straight line of a gradient "$a_1$", and a gradient "$a_2$" of a line segment connecting a maximum point and minimum point of a wavelength dispersion characteristics curve in a band $W_2$ adjacent to the band $W_1$ in the $FSR_1$. Wavelength dispersion characteristics of a second variable dispersion-compensating unit having a variable dispersion control function to shift the wavelength dispersion characteristics in the frequency axis include a frequency period $FSR_2$ and a frequency band $W_3$ almost approximated with a straight line of a gradient "$a_3$". In the variable dispersion compensator of the present invention, the first variable dispersion-compensating unit and the second variable dispersion-compensating unit are cascade-connected, the band $W_1$ is greater than $W_2$, an absolute value of the gradient "$a_1$" is smaller than that of "$a_2$", the gradients "$a_1$" and "$a_3$" are opposite to each other in sign and essentially equal to each other in absolute value, a range of variable dispersion quantities in a plus direction is asymmetrical with respect to a range of variable dispersion quantities in a minus direction, and wavelength dispersion is assigned to one optical signal or to plural optical signals with different wavelengths. For example, in the frequency band $W_1$, a deviation of the wavelength dispersion characteristics from the straight line of a gradient "$a_1$" is less than 5%. It is preferable for the above deviation to be less than 1%.

As described above, the present invention makes it possible to obtain a practical, variable dispersion compensator suitable for a WDM optical transmission system, the compensator providing: a wide band in which a variable amount of dispersion is shifted to the plus or minus side; a wide effective band; and a large variable amount of dispersion.

What is claimed is:

1. A variable dispersion compensator comprising:
  a first variable dispersion-compensating unit having, as wavelength dispersion characteristics,
  a frequency period $FSR_1$,
  a frequency band $W_1$ approximated with a straight line of a gradient "$a_1$" in the $FSR_1$, and
  a gradient "$a_2$" of a line segment connecting a maximum point and minimum point of a wavelength dispersion characteristics curve in a band $W_2$ adjacent to the band $W_1$ in the $FSR_1$, and
  a variable dispersion control function for shifting the wavelength dispersion characteristics in a frequency axis; and
  a second variable dispersion-compensating unit having, as wavelength dispersion characteristics,
  a frequency period $FSR_2$,
  a frequency band $W_3$ approximated with a straight line of a gradient "$a_3$" in the $FSR_2$, and a variable dispersion control function for shifting the wavelength dispersion characteristics in the frequency axis;

wherein:

the band $W_1$ is greater than $W_2$, an absolute value of the gradient "$a_2$" of the line segment connecting the maximum point and minimum point of the wavelength dispersion characteristics curve in the band $W_2$ is larger than an absolute value of the gradient "$a_1$";

the gradients "$a_1$," and "$a_3$" are opposite to each other in sign and essentially equal to each other in absolute value;

the first variable dispersion-compensating unit and the second variable dispersion-compensating unit are cascade-connected to each other;

a range of variable dispersion quantities in a plus direction is asymmetrical with respect to a range of variable dispersion quantities in a minus direction; and wavelength dispersion is assigned to one optical signal or to plural optical signals with different wavelengths.

2. The variable dispersion compensator according to claim 1, further comprising:

first temperature control means for shifting the dispersion characteristics of the first variable dispersion-compensating unit in a wavelength axis;

second temperature control means for shifting the dispersion characteristics of the second variable dispersion-compensating unit in a direction opposite to the wavelength axis;

wherein the gradients "$a_1$" and "$a_3$" are opposite to each other in sign and equal to each other in absolute quantity or a differential relative quantity of $|(a_1-a_3)/a_1|$ between "$a_1$" and "$a_3$" is equal to or smaller than 0.1.

3. The variable dispersion compensator according to claim 2, wherein:

the frequency period $FSR_1$ of the first variable dispersion-compensating unit and the frequency period $FSR_2$ of the second variable dispersion-compensating unit are equal to each other, the equal value being a required period FSR; and if an amount of shifting for dispersion characteristics adjustment, in a frequency axis, is taken as "m", and an amount of offset shifting, as "$m_{offset}$", the amount of dispersion characteristics of the first variable dispersion-compensating unit that the first temperature control means shifts in the wavelength axis is given as "$(m_{offset}+m)$", the amount of dispersion characteristics of the second variable dispersion-compensating unit that the second temperature control means shifts in the wavelength axis is given as "$(m_{offset}-m)$", and when "m" is equal to or less than $(W_3-FSR)/2$, "$m_{offset}$" is set to 0, when "m" is greater than $(W_3-FSR)/2$ and equal to or less than $(W_1-FSR)/2$, "$m_{offset}$" is set to "$m+(FSR-W_3)/2$", and "m" is greater than $(W_1-FSR)/2$, "$m_{offset}$" is set to "$(W_1-W_3)/2$".

4. A variable dispersion compensator comprising:

a first variable dispersion-compensating unit including:

a pre-compensating section which has:

a first etalon irradiated with a beam of light from a collimator, the first etalon having a required amplitude reflectance; and a first mirror inclined at a required angle equal to or greater than zero degrees with respect to the first etalon, the first mirror being disposed facing the first etalon, wherein the first etalon of the pre-compensating section reflects the beam of light an "$n_1$" number of times ("$n_1$" is a natural number); and a post-compensating section which has a second etalon irradiated with the beam of light from the pre-compensating section via another collimator;

wherein the second etalon has a required amplitude reflectance equal to or greater than the amplitude reflectance of the first etalon, and wherein a peak position of wavelength dispersion characteristics of the second etalon is shifted in a wavelength axis of the light more significantly than a peak position obtained from the pre-compensating section; and a second variable dispersion-compensating unit including:

a pre-compensating section which has:

a third etalon irradiated with the beam of light via yet another collimator, the third etalon having a required amplitude reflectance; and a third mirror inclined at a required angle equal to or greater than zero degrees with respect to the third etalon, the third mirror being disposed facing the third etalon, wherein the third etalon of the pre-compensating section reflects the beam of light an "$n_3$" number of times ("$n_3$" is a natural number), and a post-compensating section which has a fourth etalon irradiated with the beam of light from the pre-compensating section via a further collimator, the fourth etalon having an amplitude reflectance smaller than the amplitude reflectance of the third etalon;

wherein the first variable dispersion-compensating unit and the second variable dispersion-compensating unit are cascade-connected to each other.

5. The variable dispersion compensator according to claim 4, wherein the post-compensating section of the first variable dispersion-compensating unit includes a second mirror inclined at a required angle equal to or greater than zero degrees with respect to the second etalon, the second mirror being disposed facing the second etalon, and wherein the second etalon of the post-compensating section reflects the beam of light an "$n_2$" number of times ("$n_2$" is a natural number).

6. The variable dispersion compensator according to claim 5, wherein the post-compensating section of the second variable dispersion-compensating unit includes a fourth mirror inclined at a required angle equal to or greater than zero degrees with respect to the fourth etalon, the fourth mirror being disposed facing the fourth etalon, and wherein the fourth etalon of the post-compensating section reflects the beam of light an "$n_4$" number of times ("$n_4$" is a natural number).

7. The variable dispersion compensator according to claim 4, wherein:

the first etalon includes first and second planes opposed to each other;

the second plane and a reflection plane of the first mirror are inclined at a first angle equal to or greater than zero degrees with respect to each other, both the second plane and the reflection plane being arranged facing each other;

the second etalon includes third and fourth planes opposed to each other;

the fourth plane and a reflection plane of the second mirror are inclined at a second angle equal to or greater than zero degrees with respect to each other, both the fourth plane and the reflection plane being arranged facing each other;

a value of a reflectance of the first plane is not greater than 100% and not less than 90%, and a reflectance of the second plane is lower than a reflectance of the first plane;

a value of a reflectance of the third plane is not greater than 100% and not less than 90%, and a reflectance of the fourth plane is lower than a reflectance of the third plane; and peak wavelength of dispersion characteristics of the pre-compensating section within the first variable dispersion-compensating unit is shifted in required constant quantities in a direction of smaller or greater wavelengths, with respect to peak wavelength of dispersion characteristics of the post-compensating section within the first variable dispersion-compensating unit.

8. The variable dispersion compensator according to claim 7, continuous or stepwise control is exercised so that the peak wavelength of the dispersion characteristics of the pre-compensating section within the first variable dispersion-compensating unit changes from a state in which the peak wavelength has been shifted in certain constant quantities in the direction of smaller wavelengths, with respect to peak wavelength of dispersion characteristics of the post-compensating section within the second variable dispersion-compensating unit, to a state in which the peak wavelength has been shifted in certain constant quantities in the direction of greater wavelengths.

9. The variable dispersion compensator according to claim 4, wherein each of the etalons independently includes temperature control means.

10. The variable dispersion compensator according to claim 9, wherein the temperature control means independently provided each of the etalons has at least 5° C. in temperature control range.

11. The variable dispersion compensator according to claim 9, wherein the temperature control means independently included in each of the etalons has an arithmetic converter that sets optimal temperatures of each etalon, based on an assigned amount of dispersion.

12. The variable dispersion compensator according to claim 4, wherein the beam of light is incident from respective beam output ends of the two post-compensating sections.

13. The variable dispersion compensator according to claim 4, wherein the post-compensating section of the first variable dispersion-compensating unit and/or the post-compensating section of the second dispersion-compensating unit use a multi-cavity etalon.

14. The variable dispersion compensator according to claim 4, wherein the post-compensating section of the first variable dispersion-compensating unit and/or the post-compensating section of the second dispersion compensating unit use a ring cavity.

15. The variable dispersion compensator according to claim 4, wherein the angle formed between the third etalon and the third mirror is equal to or less than one degree.

16. The variable dispersion compensator according to claim 4, wherein a substrate of the etalon is constructed of a member whose thermal expansion coefficient is not greater than $10^{-4}$ and not smaller than $10^{-6}$.

17. A variable dispersion compensator comprising:
a first variable dispersion-compensating unit including:
a first etalon irradiated with a beam of light from a collimator, the first etalon having a required amplitude reflectance; and
a first mirror disposed in parallel with respect to the first etalon;
wherein the first etalon of the first variable dispersion-compensating unit reflects the beam of light an "$n_1$" number of times ("$n_1$" is a natural number);
a second variable dispersion-compensating unit including:
a second etalon irradiated with the beam of light via another collimator, the second etalon having a required amplitude reflectance; and
a second mirror disposed at a required angle with respect to the second etalon,
wherein the second etalon of the second variable dispersion-compensating unit reflects the beam of light an "$n_2$" number of times ("$n_2$" is a natural number); and
a third variable dispersion-compensating unit including a third etalon irradiated with the beam of light via yet another collimator, the third etalon having a required amplitude reflectance;
wherein:
the first variable dispersion-compensating unit, the second variable dispersion-compensating unit, and the third variable dispersion-compensating unit are cascade-connected to one another; and
each of the etalons independently includes temperature control means, the temperature control means further including an arithmetic converter which sets optimal temperatures of each etalon, based on an assigned amount of dispersion.

18. The variable dispersion compensator according to claim 17,
wherein the third variable dispersion-compensating unit includes a third mirror inclined at a required angle equal to or greater than zero degrees with respect to the third etalon, the third mirror being disposed facing the third etalon, and
wherein the third etalon of the third variable dispersion-compensating unit reflects the beam of light an "$n_3$" number of times ("$n_3$" is a natural number).

* * * * *